US008294693B2

(12) United States Patent
Walberg et al.

(10) Patent No.: US 8,294,693 B2
(45) Date of Patent: Oct. 23, 2012

(54) PORTABLE INPUT DEVICE, METHOD FOR CALIBRATION THEREOF, AND COMPUTER READABLE RECORDING MEDIUM STORING PROGRAM FOR CALIBRATION

(75) Inventors: Per-Erik Walberg, San Jose, CA (US); Chao King, Fremont, CA (US); John Randall Christ, Santa Clara, CA (US)

(73) Assignee: Konica Minolta Holdings, Inc. (JP)

( * ) Notice: Subject to any disclaimer, the term of this patent is extended or adjusted under 35 U.S.C. 154(b) by 600 days.

(21) Appl. No.: 12/567,028

(22) Filed: Sep. 25, 2009

(65) Prior Publication Data

US 2011/0074674 A1    Mar. 31, 2011

(51) Int. Cl.
G06F 3/042     (2006.01)
G06F 3/041     (2006.01)
(52) U.S. Cl. ...... 345/175; 345/173; 345/178; 178/18.01
(58) Field of Classification Search .......... None
See application file for complete search history.

(56) References Cited

U.S. PATENT DOCUMENTS 6,421,042 B1     7/2002   Omura et al. ............... 345/157
2010/0201812 A1*  8/2010   McGibney et al. .......... 348/143

* cited by examiner

Primary Examiner — Andrew L Sniezek
(74) Attorney, Agent, or Firm — Cantor Colburn LLP

(57) ABSTRACT

Provided are a portable input device for inputting coordinates, a method of calibrating the device, and a computer readable recording medium storing a computer program for making a computer perform the method. The portable input device includes two digital cameras, a calibration tool, a storage section, and a controller for calculating coordinates of an object on an input surface based on images taken by the two digital cameras based on images taken by the two digital cameras so as to include the calibration tool. The controller also calibrates positions and widths of a detection band which corresponds to a detection zone defined in a vicinity of the input surface. The positions and the widths of the detection band are stored in the storage section in relationship to positions on the input surface.

39 Claims, 29 Drawing Sheets

PORTABLE INPUT DEVICE, METHOD FOR CALIBRATION THEREOF, AND COMPUTER READABLE RECORDING MEDIUM STORING PROGRAM FOR CALIBRATION

TECHNICAL FIELD

This invention relates to portable input devices, methods for calibration thereof, and computer readable recording media storing a computer program for calibration thereof, more particularly to portable input devices which have a plurality of imaging devices, used in combination with a computer to input coordinate data of a point, and to methods for calibration thereof and computer readable recording media storing a computer program for calibration thereof.

BACKGROUND

Touch panels and electronic whiteboards are computer input device applications where image sensor modules are currently applied. In these applications the sensor images are captured by a computer and analyzed to determine the coordinates of the point pointed by the user (see U.S. Pat. No. 6,421,042).

In the case of a touch panel application, the sensor modules are used in conjunction with an active display such as an LCD or plasma display, or a passive display such as a projector screen. In the case of an active display, the input area of the display defines an active area that the user can interact with, and in the case of the passive display the projected image defines the input area that the user can interact with.

In the case of an electronic whiteboard application, the user writes information on the panel which in turn is transferred to the computer. The area allocated to writing defines the input area that the user can interact with.

In both the touch panel and electronic whiteboard applications described above, the image sensor modules must be located in such a way that they cover the predefined input area of the display or whiteboard. The placement of the image sensor modules in turn defines the parameters that are used by an image processing system to calculate the coordinates of an object within the input area of the panel. Triangulation is used to calculate the coordinates, which uses the interval between the sensor modules and the three independent rotational angles of the sensor modules as parameters.

In the case of a touch panel application, the image processing system extracts the following information from the images captured by the sensor modules.

The location (coordinates) of an object on the panel;
The location of the panel surface in the sensor image; and
Whether an object is touching the panel surface or is close enough to the panel surface to be considered touching.

The location of the panel surface is typically located at the edge of a fixed band of pixel lines defined by the mechanical alignment of the image sensor module with respect to the surface.

In order for the image processing system to decide when a pointing object touches or is close enough to the panel surface, a virtual layer with a predetermined thickness is defined in the vicinity of the panel surface. This layer is referred to as a detection zone, and a band of pixels are defined on the image sensor to correspond to the detection zone. When the pointing object is within this band, an algorithm determines that the object is touching the surface of the panel. The location and the mechanical alignment of the sensor module with respect to the panel surface are critical for this approach to work.

These devices of the prior art, however, have the following problems: Critical mechanical alignment of image sensor modules is required to define the portion covered by the sensor module that is used by the detection algorithm of the image processing system; Precision housing units are required that work with special mounting brackets that work with only certain panel configurations; The image sensor modules being installed in place as part of the device with an interval determined at the time of manufacturing and with an input area limited to a single area defined by the factory configuration.

Thus, it is impossible to quickly create a computer input interactive area by placing image sensor modules on a surface such as a table by using the conventional arts. That is because of the critical mechanical alignment required to allocate a fixed portion of the pixels to a detection zone for the image processing system.

In the mean time, an input device using image sensor modules to define an arbitrary virtual area in space is not provided today.

SUMMARY

In view of forgoing, on embodiment according to one aspect of the present invention is a portable input device, comprising:

a first image pickup device having an image sensor;
a second image pickup device which has an image sensor and is provided away from the first image pickup device to define a baseline having a predetermined baseline length extending from the first image pickup device to the second image pickup device, wherein a first optical axis of the first image pickup device and the baseline form a first angle, and a second optical axis of the second image pickup device and the baseline form a second angle; an input surface is defined in a vicinity of a surface including the baseline, the first optical axis, and the second optical axis; a detection zone having a predetermined thickness is defined in a vicinity of the input surface so as to cover the input surface; at least one of the first image pickup device and the second pickup device is assumed as a detection image pickup device; the image sensor of the detection image pickup device is assumed as a detection image sensor; and a detection band is defined as an image, of the detection zone at a predetermined position on the input surface, assumed to be formed on the detection image sensor;
a calibration tool having an dimension indicator thereon;
a controller configured to process a first image and a second image, the first image which is taken by the first image pickup device with the calibration tool placed at a first position on the input surface, the second image which is taken by the second image pickup device with the calibration tool placed at the first position on the input surface; obtain coordinates, normalized by the baseline length, of the first position on the input surface based on the first image, the second image, the first angle, and the second angle; obtain a first position and a first width of the detection band for the first position on the input surface based on a dimension of an image of the dimension indicator in the first image or the second image taken by the detection image pickup device; process a third image and a fourth image, the third image which is taken by the first image pickup device with the calibration tool placed at a second position on the input surface, the fourth image which is taken by the second image pickup device with the calibration tool placed at the second position on the input surface; obtain coordinates, normalized by the baseline length, of the second position on the input surface based on the third image, the fourth image, the first angle, and the second angle; obtain a second position and a second width of the detection band for the second position on the input surface based on a dimension of an image of the dimension indicator in the third image or the fourth image taken by the detection image pickup device;

a storage section configured to store the first position and the first width of the detection band in relationship to the first position on the input surface, and store the second position and the second width of the detection band in relation to the second position on the input surface.

According to another aspect of the present invention, another embodiment is a method for configuring a portable input device, the method comprising the steps of:

arranging a first image pickup device having an image sensor and a second image pickup device having an image sensor such that the first image pickup device and the second image pickup device define a baseline having a predetermined baseline length extending from the first image pickup device to the second image pickup device, wherein a first optical axis of the first image pickup device and the baseline form a first angle, and a second optical axis of the second image pickup device and the baseline form a second angle; an input surface is defined in a vicinity of a surface including the baseline, the first optical axis, and the second optical axis; a detection zone having a predetermined thickness is defined in a vicinity of the input surface so as to cover the input surface; at least one of the first image pickup device and the second pickup device is assumed as a detection image pickup device; the image sensor of the detection image pickup device is assumed as a detection image sensor; and a detection band is defined as an image, of the detection zone at a predetermined position on the input surface, assumed to be formed on the detection image sensor;

placing a calibration tool having an dimension indicator thereon, at a first position on the input surface;

taking a first image with the first image pickup device and a second image with the second image pickup device, the first image and the second image both including the input surface and the calibration tool at the first position on the input surface;

obtaining coordinates, normalized by the baseline length, of the first position on the input surface based on the first image, the second image, the first angle, and the second angle;

obtaining a first position and a first width of the detection band for the first position on the input surface based on a dimension of an image of the dimension indicator in the first image or the second image taken by the detection image pickup device;

placing the calibration tool at a second position on the input surface;

taking a third image with the first image pickup device and a fourth image with the second image pickup device, the third image and the fourth image both including the input surface and the calibration tool at the second position on the input surface;

obtaining coordinates, normalized by the baseline length, of the second position on the input surface based on the third image, the fourth image, the first angle, and the second angle;

obtaining a second position and a second width of the detection band for the second position on the input surface based on a dimension of an image of the dimension indicator in the third image or the fourth image taken by the detection image pickup device;

storing in a storage section the first position and the first width of the detection band in relation to the first position on the input surface; and storing in the storage section the second position and the second width of the detection band in relation to the second position on the input surface.

According to another aspect of the present invention, another embodiment is a computer-readable recording medium storing a program for making a computer perform a method for configuring a portable input device, the method comprising the steps of:

arranging a first image pickup device having an image sensor and a second image pickup device having an image sensor such that the first image pickup device and the second image pickup device define a baseline having a predetermined baseline length extending from the first image pickup device to the second image pickup device, wherein a first optical axis of the first image pickup device and the baseline form a first angle, and a second optical axis of the second image pickup device and the baseline form a second angle; an input surface is defined in a vicinity of a surface including the baseline, the first optical axis, and the second optical axis; a detection zone having a predetermined thickness is defined in a vicinity of the input surface so as to cover the input surface; at least one of the first image pickup device and the second pickup device is assumed as a detection image pickup device; the image sensor of the detection image pickup device is assumed as a detection image sensor; and a detection band is defined as an image, of the detection zone at a predetermined position on the input surface, assumed to be formed on the detection image sensor;

placing a calibration tool having an dimension indicator thereon, at a first position on the input surface;

taking a first image with the first image pickup device and a second image with the second image pickup device, the first image and the second image both including the input surface and the calibration tool at the first position on the input surface;

obtaining coordinates, normalized by the baseline length, of the first position on the input surface based on the first image, the second image, the first angle, and the second angle;

obtaining a first position and a first width of the detection band for the first position on the input surface based on a dimension of an image of the dimension indicator in the first image or the second image taken by the detection image pickup device;

placing the calibration tool at a second position on the input surface;

taking a third image with the first image pickup device and a fourth image with the second image pickup device, the third image and the fourth image both including the input surface and the calibration tool at the second position on the input surface;

obtaining coordinates, normalized by the baseline length, of the second position on the input surface based on the third image, the fourth image, the first angle, and the second angle;

obtaining a second position and a second width of the detection band for the second position on the input surface based on a dimension of an image of the dimension indicator in the third image or the fourth image taken by the detection image pickup device;

storing in a storage section the first position and the first width of the detection band in relation to the first position on the input surface; and storing in the storage section the second position and the second width of the detection band in relation to the second position on the input surface.

DETAILED DESCRIPTION OF THE PREFERRED EMBODIMENT

Figure 1:
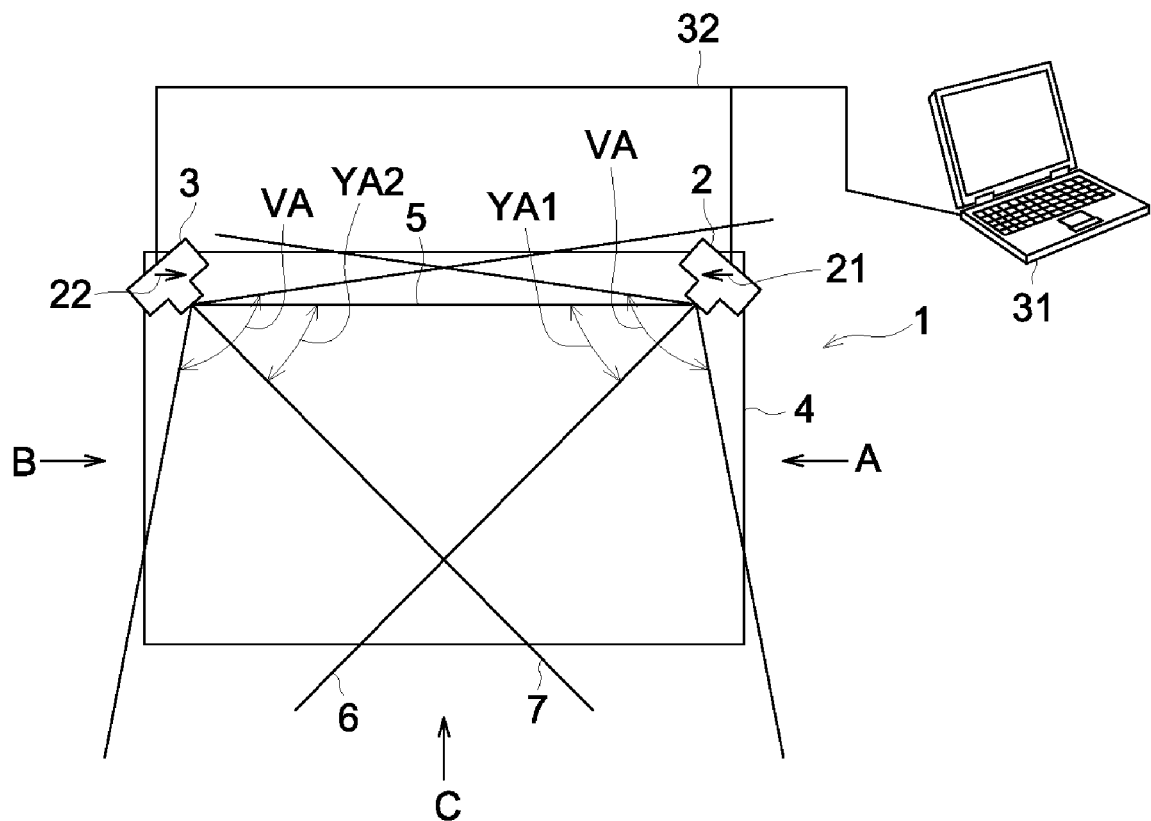
FIG. 1 is a diagram showing an outline view of a portable input device according to a first embodiment of the present invention.

The embodiments of the present invention will be described below with reference to the accompanied drawings. In the detailed description of the embodiments, the same reference numeral is assigned to the same or like element, and the description is omitted to avoid duplication.

<First Embodiment>

FIG. 1 shows an outline view of a portable input device 1 of a first embodiment according to the present invention. The portable input device is equipped with a first digital camera 2 and a second digital camera 3, which are mounted on a whiteboard 4 with brackets 8 and 10, respectively. The positions of the two digital cameras define a base line 5 therebetween. The base line 5 and the optical axes 6 and 7 of the first and second digital cameras 2 and 3 form yaw angles YA1 and YA2. Reference numerals 21 and 22 represent arrow marks printed on the top of the digital cameras 2 and 3 are used to align the yaw angles YA1 and YA2. Reference character VA represents a horizontal viewing angle of the digital cameras 2 and 3. The two digital cameras 2 and 3 are electrically connected to a personal computer (hereinafter, referred to as PC) 31 through a communication bus 32 such as USB.

Figure 2A:
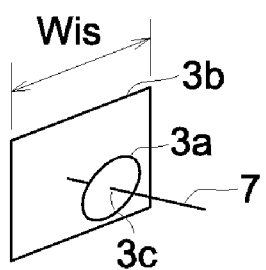
FIGS. 2a and 2b are diagrams showing schematic structures of digital cameras of the first embodiment.
Figure 2B:
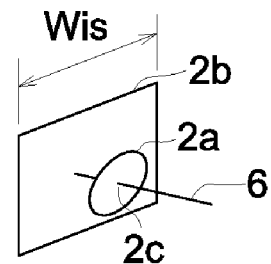

FIGS. 2a and 2b show schematic structures of the digital cameras 2 and 3. Reference numerals 2a and 3a represent a taking lens, and reference numerals 2b and 3b represent an image sensor such as a CCD and a CMOS image sensor. The lens centers 2c and 3c of the lenses 2a and 3a represents the position of the digital camera, and the base line 5 starts from one of the lens centers and ends at the other lens center. The length of the base line is assumed as Lb. Reference numeral FL is a distance between the lens center and the surface of the image sensor, and Wis is the width of the surface of the image sensor. In this embodiment, FL is the same as the focal length of the taking lens, since the taking lens of the digital camera is focused to infinity.

Figure 3:
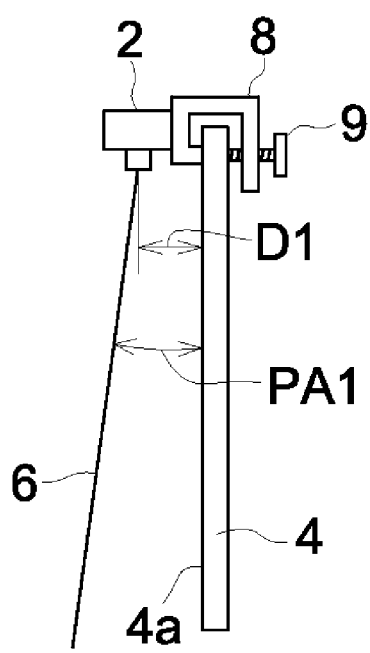
FIG. 3 is a diagram showing a side view, viewed from the direction of the arrow A of FIG. 1, of the portable input device of the first embodiment.

FIG. 3 shows a side view, viewed from the direction of arrow A, of the portable input device 1. The first digital camera 2 is mounted on an input surface 4a of the whiteboard 4 with the bracket 8 which is fixed with a screw 9 to the whiteboard 4. Reference character D1 represents the distance from the center of the lens of the first camera 2 and the input surface 4a. A first optical axis 6 of the first digital camera 2 and the input surface 4a form a pitch angle PA1 between them.

Figure 4:
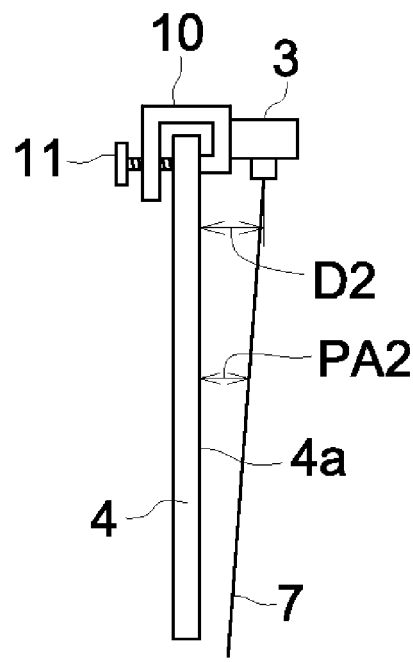
FIG. 4 is a diagram showing a side view, viewed from the direction of arrow B of FIG. 1, of the portable input device of the first embodiment of the present invention.

FIG. 4 shows a side view, viewed from the direction of arrow B, of the portable input device 1. The second digital camera 3 is mounted on the input surface 4a of the whiteboard 4 with the bracket 10 which is fixed with a screw 11 to the whiteboard 4. Reference character D2 represents the distance from the center of the lens of the second camera 3 and the input surface 4a. A second optical axis 7 of the second digital camera 3 and the input surface 4a form a pitch angle PA2 between them. The pitch angles PA1 or PA2 are typically supposed to be zero. However, they can have a none-negligible value due to possible unevenness of the input surface 4a of the whiteboard 4 at the position at which the digital camera 2 or 3 is mounted.

Figure 5:
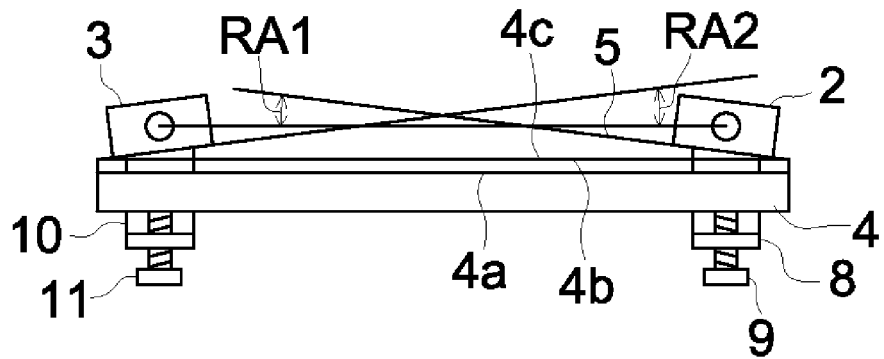
FIG. 5 is a diagram showing a bottom view, viewed from the direction of arrow C of FIG. 1, of the portable input device of the first embodiment of the present invention.

FIG. 5 shows a bottom view, viewed from the direction of arrow C of FIG. 1, of the portable input device 1. Reference numeral 4b is a detection zone that is located in the vicinity of the input surface 4a and has a thickness of 5 mm. Reference numeral 4c is a top surface of the detection zone 4b. The detection zone 4b is used to detect an object that is pointing to a position on the input surface 4a. When the object is detected to be within the detection zone, the object is determined to be in touch with the input surface, even if there is still a space between the object and the input surface 4a. The bottom sides of the image sensors 2b and 3b (the bottom side is here supposed to be parallel to the bottom surface of the digital camera) and the input surface 4a form roll angles RA1 and RA2 about the optical axes 6 and 7. These roll angles RA1 or RA2 can have a non-negligible value when the input surface is uneven at the position at which the digital camera 2 or 3 is mounted.

Figure 6:
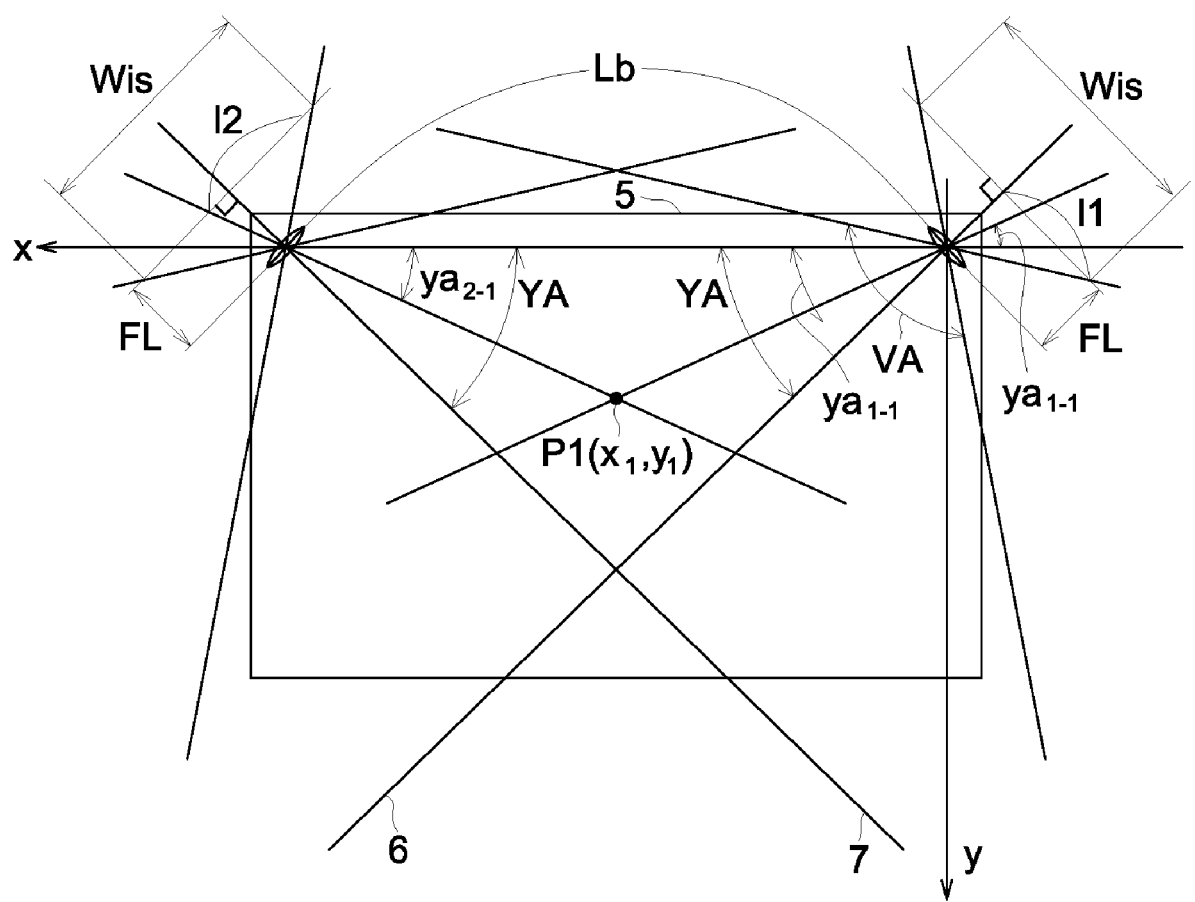
FIG. 6 is a diagram showing a coordinate system of the first embodiment of the present invention.

FIG. 6 is a figure for describing how to calculate the coordinate of an object and shows a coordinate system of the first embodiment. The x and y axes are on the input surface 4a, where the origin O is located at the position at which the lens center of the first digital camera 2 is projected perpendicular to the input surface 4a. The point $P1(x_1, y_1)$ is an exemplary point of an object used by the user to point a position, and how the coordinate $(x_1, y_1)$ of the point P1 is calculated in this embodiment is described below.

Figure 7A:
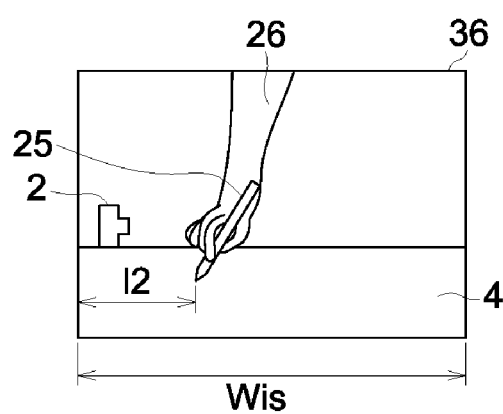
FIGS. 7a and 7b are diagrams showing images taken by the digital cameras when inputting a point on the first embodiment of the present invention.

FIG. 7a is an image 36 taken by the second digital camera 3, where the width of the image 36 is assumed Wis, which is the width of the image sensor (see FIGS. 2a and 2b), reference numeral 26 is the user's hand holding a pen 25 to write something on the input surface 4a of the white board 4. The tip of the pen 25 is in contact with the input surface at point $P1(x_1, y_1)$. Reference character 12 represent a horizontal distance from the left edge of the image 36 to the tip of the pen 25. It should be noted that the width of an image taken by the digital camera is always assumed Wis hereinafter.

Figure 7B:
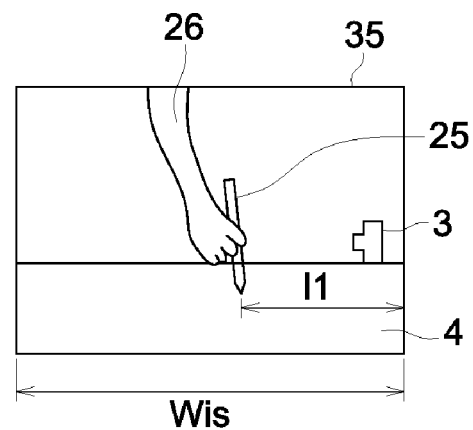

FIG. 7b is an image 35 taken by the first digital camera 2, where reference numeral 26 is the user's hand holding a pen 25 to write something on the input surface 4a of the white board 4. The tip of the pen 25 is in contact with the input surface at point $P1(x_1, y_1)$. Reference character 11 represent a horizontal distance from the right edge of the image 35 to the tip of the pen 25.

<How to Calculate the Coordinates $(x_1, y_1)$ of the Input Point P1>

As describe above, the angular parameters PA1, PA2, RA1, RA2, and the dimensional parameters D1 and D2 have some value, and the yaw angles YA1 and YA2 are different from each other. However, when calculating coordinates of an object on the input surface, the parameters PA1, PA2, RA1, RA2, D1, and D2 can be assumed to be zero, and YA1 and YA2 are assumed to be YA for the following reasons: the surface of the white board is usually not very rough; the existence of D1 or D2 does not create a substantial error; and the yaw angles can be adjusted through the calibration (to be described later) so that YA1 and YA2 have substantially the same value YA.

The coordinate $(x_1, y_1)$ of the input point P1 pointed by the user is calculated as follows using the parameter YA.

In FIG. 6, angle $ya_{1-1}$ between the base line 5 and the first optical axis 6 and angle $ya_{2-1}$ between the base line and the second optical axis 7 are calculated from l1, l2, FL, Wis, YA1, and YA2 by the following equations:

$$ya_{1-1} = YA - \tan^{-1}((l1 - Wis/2)/FL) \qquad \text{equation (1)}$$

$$ya_{2-1} = YA - \tan^{-1}((l2 - Wis/2)/FL) \qquad \text{equation (2)}$$

The coordinates $x_1$ and $y_1$ are thus calculated by the following equations:

$$x_1 = Lb \times \tan(ya_{2-1})/(\tan(ya_{1-1}) + \tan(ya_{2-1})) \qquad \text{equation (3)}$$

$$y_1 = x_1 \times \tan(ya_{1-1}) \qquad \text{equation (4)}$$

In the above equations, the length of the base line 5 is assumed as Lb, but Lb can be substituted by an actual base line length or assumed as 1. When Lb has an actual base line length, the coordinate $P1(x_1, y_1)$ is calculated in a real dimension, and when Lb is assumed as 1, the coordinate $P1(x_1, y_1)$ is normalized by Lb.

<Calibration of Camera Arrangement>

The digital cameras 2 and 3 are mounted on the top side of the whiteboard 4 with the brackets 8 and 10. A first arrow mark 21 and a second arrow mark 22 are printed on the top of the first digital camera 2 and the second digital camera 3, respectively (see FIG. 1). The first arrow mark 21 is disposed so as to form an angle of YA between itself and the first optical axis, and the second arrow mark 22 is disposed on the top of the second digital camera 3 so as to form an angle of YA between itself and the second optical axis 7. The arrangement of the two digital cameras 2 and 3 is adjusted such that the arrow marks 21 and 22 point each other. In this manner, the yaw angles of the two digital cameras 2 and 3 are approximately set to YA. In the case where the input surface 5a is even enough, the angular parameters PA1, PA2, RA1, and RA2 are substantially zero.

Figure 10:
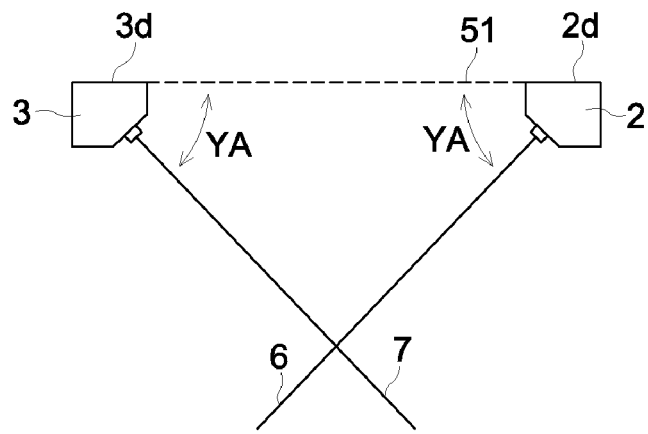
FIG. 10 is a diagram showing another aspect, for adjusting the camera arrangement, of the first embodiment of the present invention.

FIG. 10 shows another aspect of the first embodiment for adjusting the yaw angles YA1 and YA2. Reference numeral 2d represents a first side wall of the first digital camera 2, and the first side wall is configured to form an angle of YA between itself and the first optical axis 6. Similarly, a second side wall 3d of the second digital camera 3 is configured to form an angle of YA between itself and the second optical axis 7. A string 51 is extended between the two digital cameras 2 and 3, and the digital cameras 2 and 3 are arranged in such a way that the side walls 2d and 3d are parallel to the string, whereby the yaw angles of the digital cameras are approximately set to YA.

Figure 11:
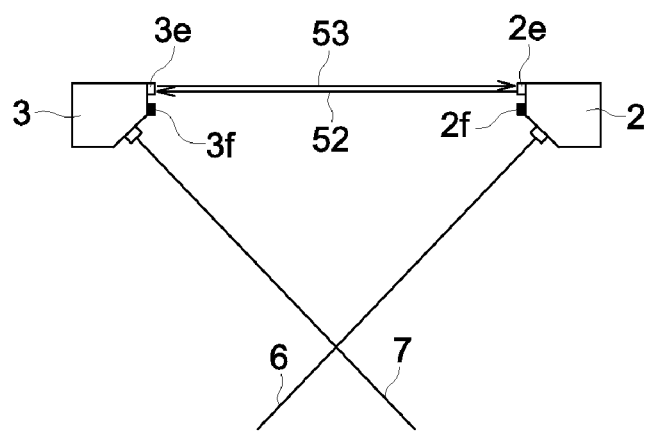
FIG. 11 is a diagram showing another aspect, for adjusting the camera arrangement, of the first embodiment of the present invention.

FIG. 11 shows another aspect of the first embodiment for adjusting the yaw angles YA1 and YA2. Reference numeral 2e represents a first laser diode for emitting a laser beam 52 toward the second digital camera 3, and reference numeral 3e is a second laser diode for emitting a laser beam 53 toward the second digital camera. The first laser diode 2e is disposed on the first digital camera 2 such that the laser beam 52 forms an angle of YA between the first laser beam and the first optical axis. The second laser diode 3e is disposed on the digital camera 3 such that the second laser beam 53 forms an angle of YA between the second laser beam 53 and the optical axis 7. The arrangement of the digital cameras 2 and 3 are adjusted such that the laser beams 52 and 53 fall in the vicinities of the first and second laser diodes 3e and 2e, respectively, whereby the arrangement of the first and second digital cameras 2 and 3 is adjusted with the yawing angles YA1 and YA2 being approximately set to YA. In this aspect of the first embodiment, there may be detection regions 2f and 3f provided to reflect the incoming laser beams to facilitate the user to see where on the camera the laser beam reaches. The detection regions 2f and 3f can be printed on the camera bodies in a light color, or reflective matters can be mounted on the camera bodies. The surface of the detection regions 2f and 3f preferably include a rough surface for easy observation of the incoming laser beam.

Figure 12:
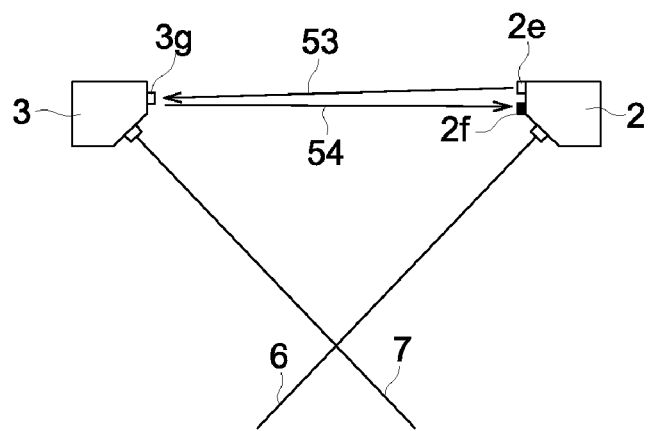
FIG. 12 is a diagram showing another aspect, for adjusting the camera arrangement, of the first embodiment of the present invention.

FIG. 12 shows another aspect of the first embodiment for adjusting the yaw angles YA1 and YA2. Reference numeral 3g represents a reflection region for reflecting the incoming laser beam 52 emitted from the first laser diode 2e toward the second digital camera 3. The reflection region 3g is provided on the digital camera 3 such that the normal line of the reflection region 3g forms an angle of YA between itself and the optical axis 7. Thus, when the arrangement of the first and second digital cameras 2 and 3 are adjusted such that the laser beam 54 reflected on the reflection region 3g falls in the vicinity of the laser diode 2e, the yaw angles YA1 and YA2 are set to YA.

Figure 13A:
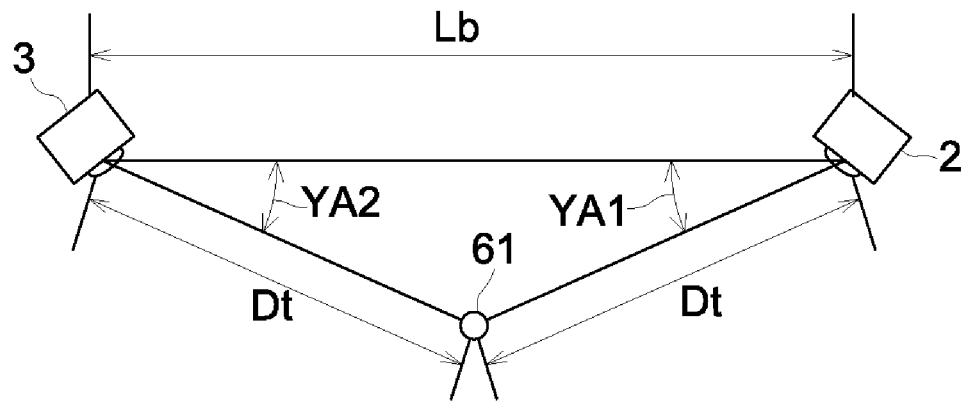
FIGS. 13a and 13b are diagrams showing another aspect of adjusting the camera arrangement of the first embodiment of the present invention.
Figure 13B:
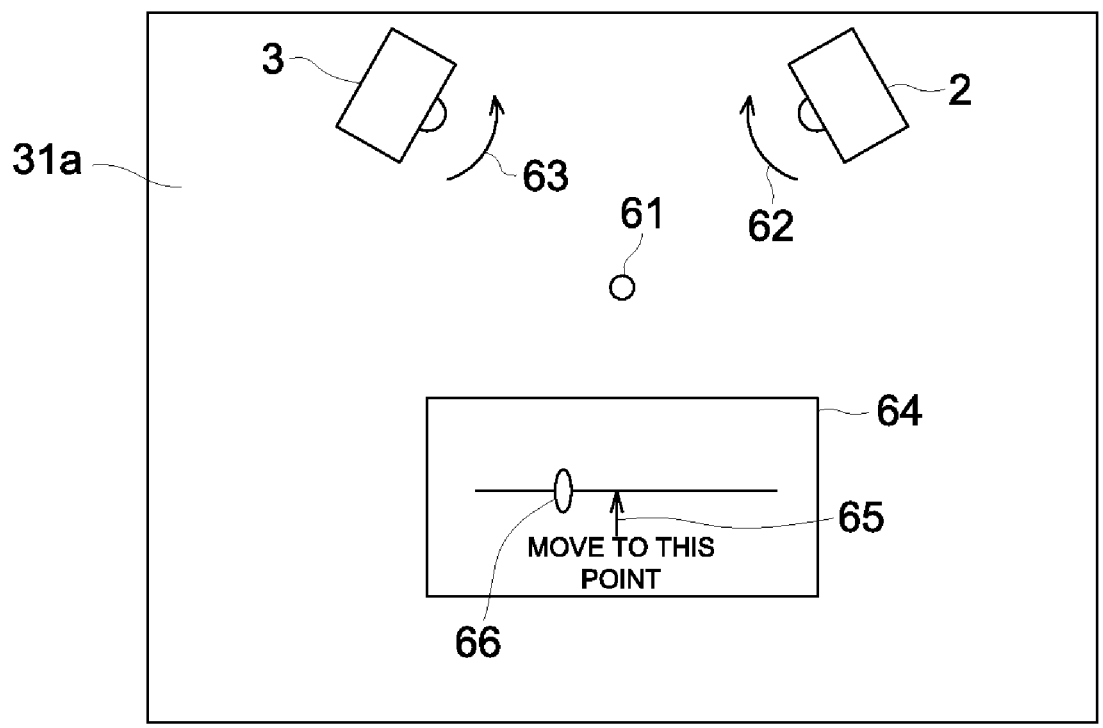

FIGS. 13a and 13b show another aspect of the first embodiment for adjusting the yaw angles YA1 and YA2. In this aspect, an alignment tool 61, the PC 31, and an adjustment program for the PC 31 are used. When performing the adjustment, the user first arranges the two digital cameras 2 and 3 and the alignment tool 61 in such a way that the viewing fields of the digital cameras 2 and 3 may cover the input area, and the distances between the alignment tool 61 and each of the digital cameras 2 and 3 are identical. Second, the user measures the distance Lb between two digital cameras 2 and 3 and the distance Dt between the digital cameras 2 and 3 and the alignment tool 61. Regarding the alignment tool 61, it is an orange-colored 3 cm sphere object equipped with a sucker to stick to the input surface 4a, but the shape, color, and size are not limited thereto as far as the alignment tool can be detected through image processing by the adjustment program. In addition, the means for putting the adjustment tool 61 on the input surface 4a is not limited to a sucker, and a magnet can be used.

When the adjustment program starts, the user is required to key in the measured dimensions Lb and Dt, and when those dimensions are input, the computer screen 92 displays as shown in FIG. 13b. In FIG. 13b, the configuration of the digital cameras 2 and 3, and the alignment tool 61 is displayed in the display screen 31a. The PC 31 controls the digital cameras to continuously take images, and the PC 31 calculates the YA1 and the YA2 from the input Lb and Dt in addition to the position of the image of the adjustment tool 31 on the taken images. Based on the calculated YA1 and YA2, the PC 31 instructs the user to adjust which digital camera in which direction by the arrows 62 and 63 so that YA1 and YA2 are adjusted to have approximately the same value, and the input area, where the fields of view of the two digital cameras 2 and 3 overlap each other, is adjusted to cover an appropriate area on the input surface 4a.

The arrow 62 or 63 is selectively displayed, and the user is supposed to adjust the digital camera, in the direction indicated by the arrow. The PC 31 also display an indication window 64, where a fixed target mark 65 and a moving indicator 66 are displayed, and the distance between the fixed target mark 65 and the moving indicator 66 shows how much the camera should be rotated. The user can physically adjust the yaw angles of the digital cameras 2 and 3 following the indication of the arrow 62 or 63 and the indication window 64.

Figure 13C:
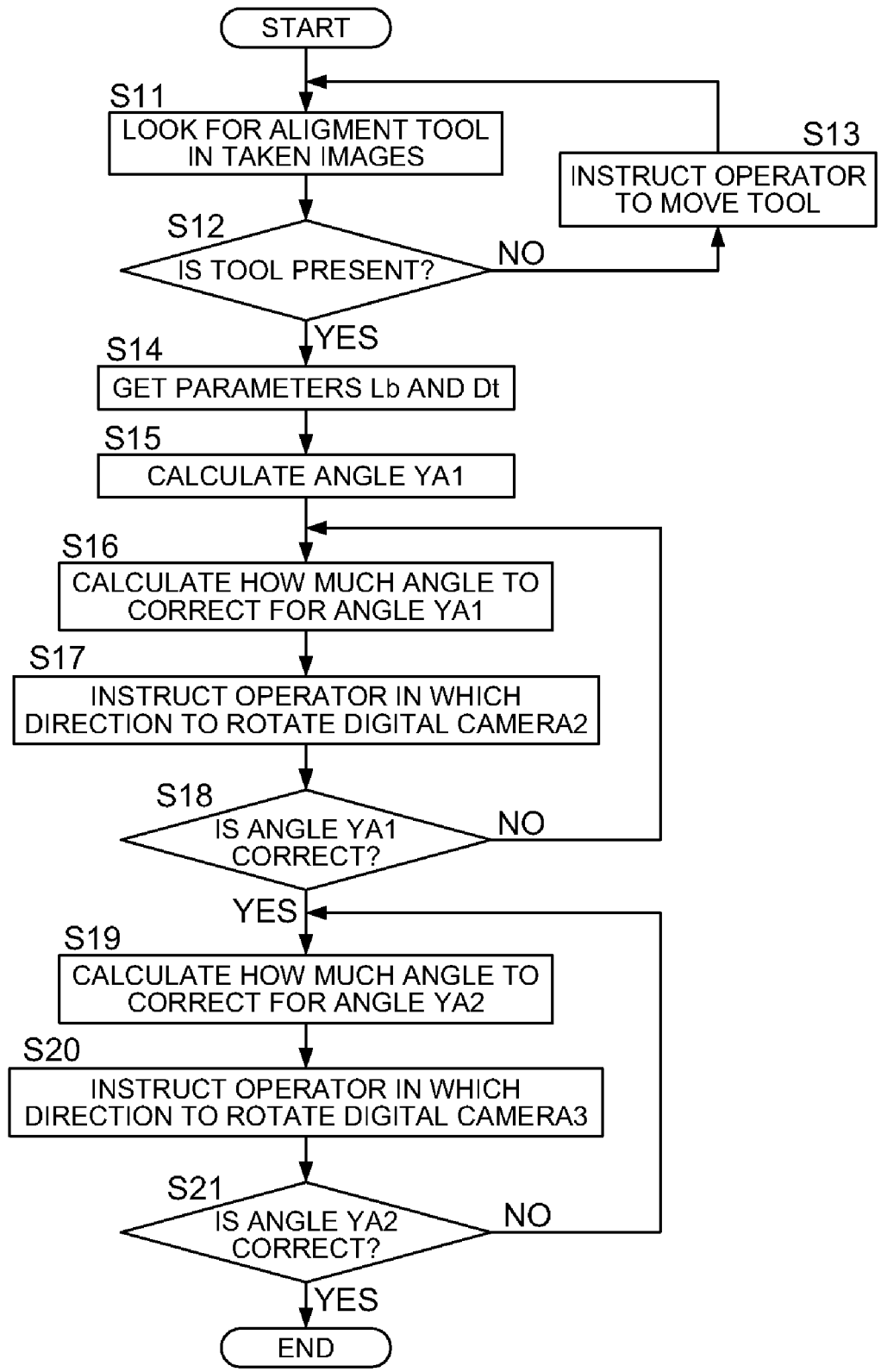
FIG. 13c is a diagram showing a flowchart of a rotational alignment program of the first embodiment of the present invention.

FIG. 13c shows a flowchart of a rotational alignment program used in the above-described method. When the rotational alignment program starts, the digital cameras 2 and 3 start to take images simultaneously and to look for the alignment tool 61 in the taken images (step S11). If the tool 61 is in the images (step S12, Yes), the flow goes to step S14. If No at step S12, the flow repeats step S11. At step S14, the PC 31 gets the parameters Lb and Dt from the operator, and calculates the angle YA1 (step S15). At step S16, the PC 31 calculates how much the angle YA1 to be corrected in which direction, and tells the operator (step S17) on the display screen 31a as shown in FIG. 13b. At step S18, the PC 31 checks based on the taken images if the angle YA1 is correct, and if the angle YA1 is correct (step S18, Yes), the flow goes to step S19. If No at step S18, the flow goes back to step S16. At step S19, the PC 31 calculates how much the angle YA2 to be corrected in which direction, and tells the operator (step S19) on the display screen 31a as shown in FIG. 13b. At step S21, the PC 31 checks based on the taken images if the angle YA2 is correct, and if the angle YA2 is correct (step S121, Yes), the flow ends. If No at step S21, the flow goes back to step S19.

Figure 14:
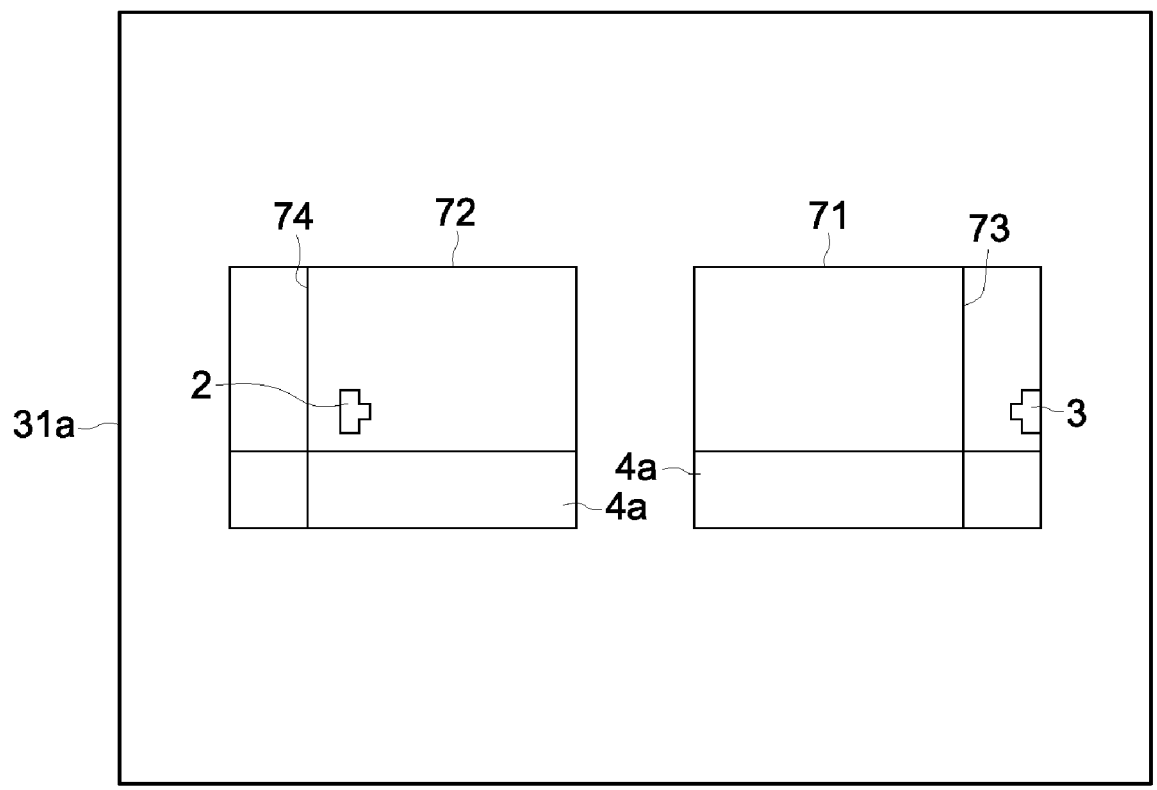
FIG. 14 is a diagram showing another aspect, for adjusting the camera arrangement, of the first embodiment of the present invention.

FIG. 14 shows another aspect of the first embodiment for adjusting the yaw angles YA1 and YA2. In this aspect of the embodiment, the PC 31 and an adjustment program are used. The PC 31 controls the two digital cameras 2 and 3 to continuously take images and displays the taken images 71 and 72 on the computer screen 92. The image 71 is the image taken by the digital camera 2 and includes the image of the other digital camera 3 and the input surface 4a. The image 72 is the image taken by the second digital camera 3 and includes the other digital camera 2 and the input surface 4a. On the images 71 and 72, adjustment lines 73 and 74 fixed in position are superimposed. The user adjusts the yaw angles of the digital cameras 2 and 3 such that the images of the cameras 2 and 3 are located on the adjustment line 74 and 73, respectively. In this manner, the yaw angles YA1 and YA2 are approximately set to the same value.

In the above description, the adjustment lines 73 and 74 are fixed in position, however the adjustment lines 73 and 74 can be changed according to the base line length Lb in order to set the input area to cover appropriate area on the input surface 4a. The base line length Lb can be obtained from the size of the image of the digital camera on the images 71 and 72 based on the focal length of the taking lenses 2a and 3a, the size of the image sensors 2b and 3b, and the actual size of the digital cameras 2 and 3.

<Calibration of the Detection Band in the Case of a Zero Roll Angle>

In the case of a whiteboard application like this embodiment, what is important is to determine when the object is close to the input surface 4a. In order to deal with this object, the detection zone with some thickness (5 mm, in this embodiment) is defined in the vicinity of the input surface and is used to detect an object. When the object is in the detection zone, the object is determined to be in touch with the input surface 4a. The cross section, of the detection zone, along a plane parallel to the image sensor surface forms, on the image sensor, an image of a band having a certain width. This band is called a detection band in the present invention. The position and the width of the detection band are varied depending on the position on the input surface 4a. In particular, the position of the detection band corresponding to the detection zone at the position farther from the image sensor surface is located lower on the image sensor surface, and the width of the detection band corresponding to the detection zone depends on the distance to the position. In the following description, it is described how to define the detection band with respect to the position on the input surface.

Figure 8:
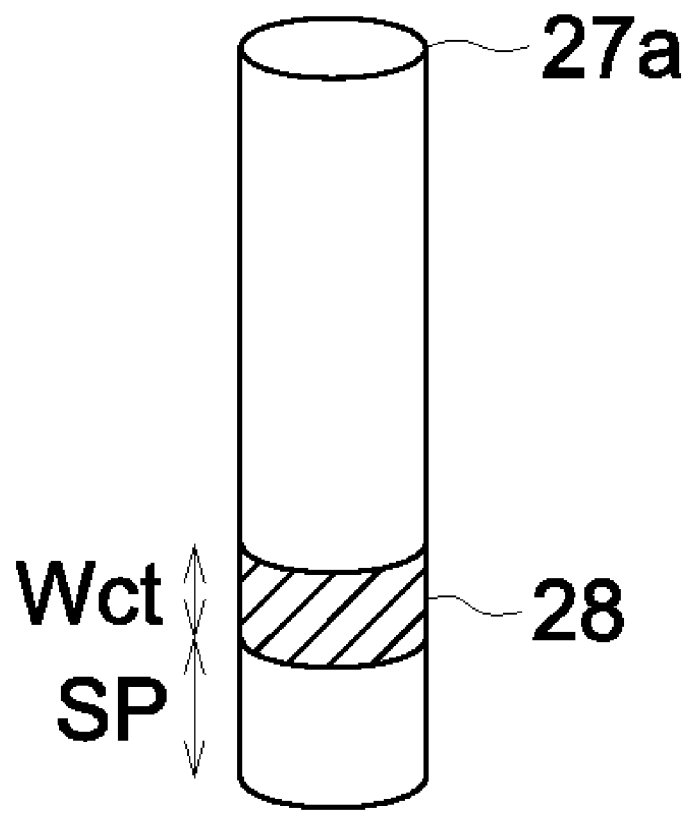
FIG. 8 is a diagram showing a calibration tool of the first embodiment of the present invention.

FIG. 8 shows an example of a calibration tool 27a. The lower end surface of the calibration tool 27a is configured to be perpendicular to the longer axis of the tool 27a, so that the calibration tool 27a is easy to be perpendicular to the input surface when it is put on the input surface 4a. The calibration tool 27a has an orange-colored cylindrical body with a green-colored dimension indicator 28 which has a width of Wct. There is provided a space of SP between the dimension indicator 28 and the tool edge. If the dimension indicator 28 were disposed at the tool end, the width of the dimension indicator 28 might be observed to be doubled on the input surface because of the reflection on the input surface 4a. Therefore, the space of SP is preferably provided between the dimension indicator 28 and the tool end.

Figure 9:
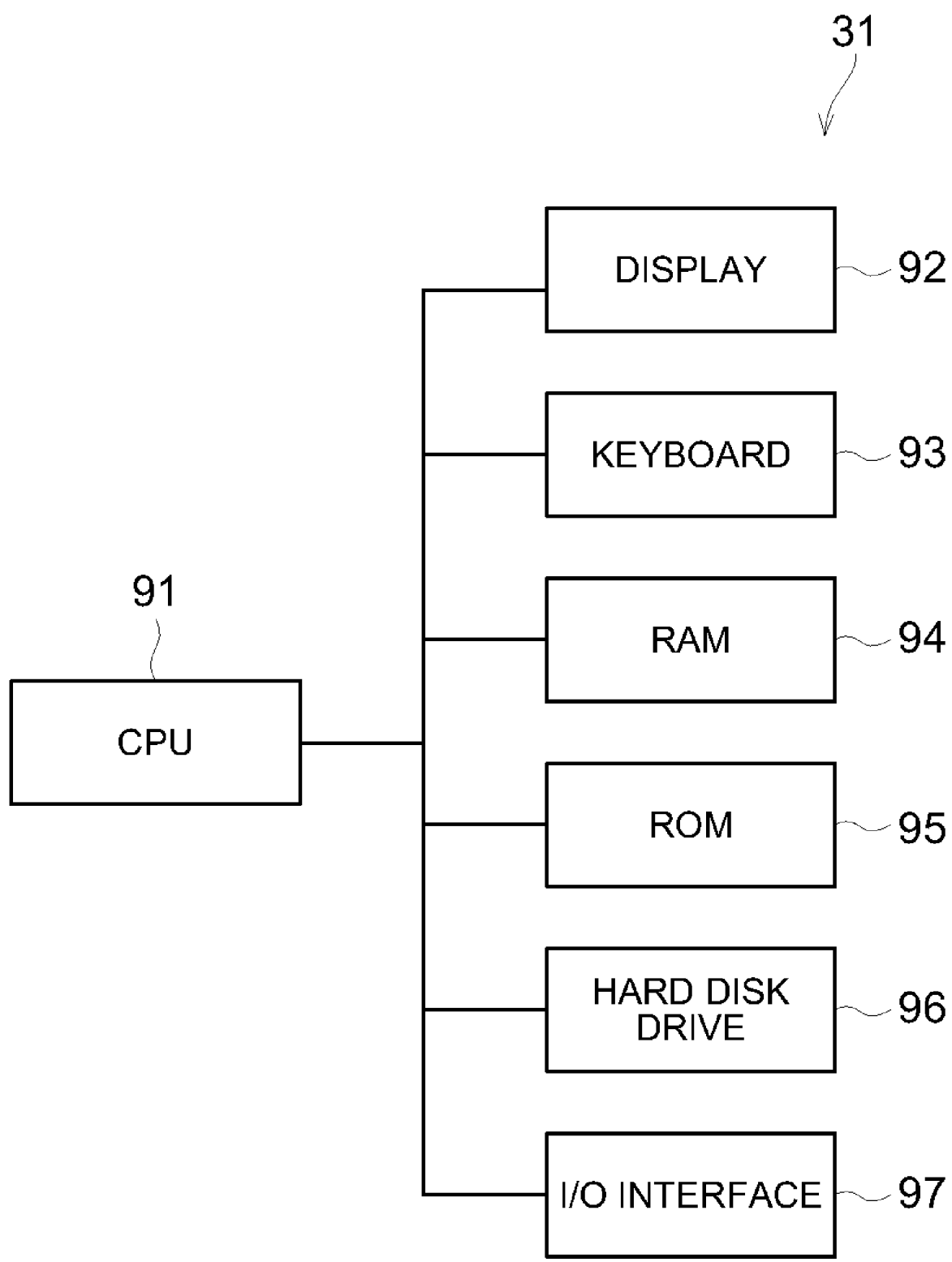
FIG. 9 is a diagram showing a configuration of the personal computer 31.

FIG. 9 shows a configuration of the personal computer 31. Reference numeral 91 denotes a CPU, 92 a display, 93 a keyboard, 94 a RAM, 95 a ROM, 96 a hard disk drive, and 97 an I/O interface.

Figure 15:
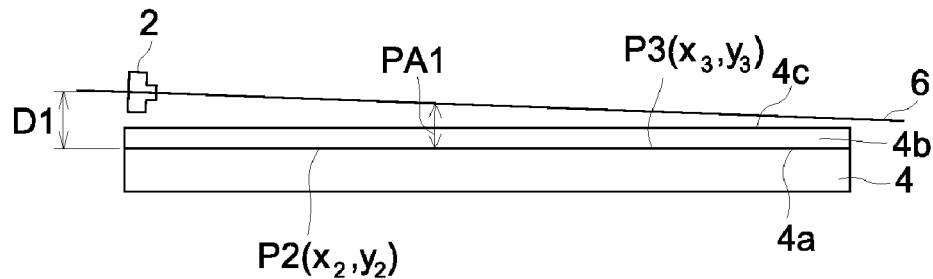
FIG. 15 is a diagram showing the orientation of the digital camera 2 with respect to the input surface 4a, and the detection zone 4b.
Figure 16A:
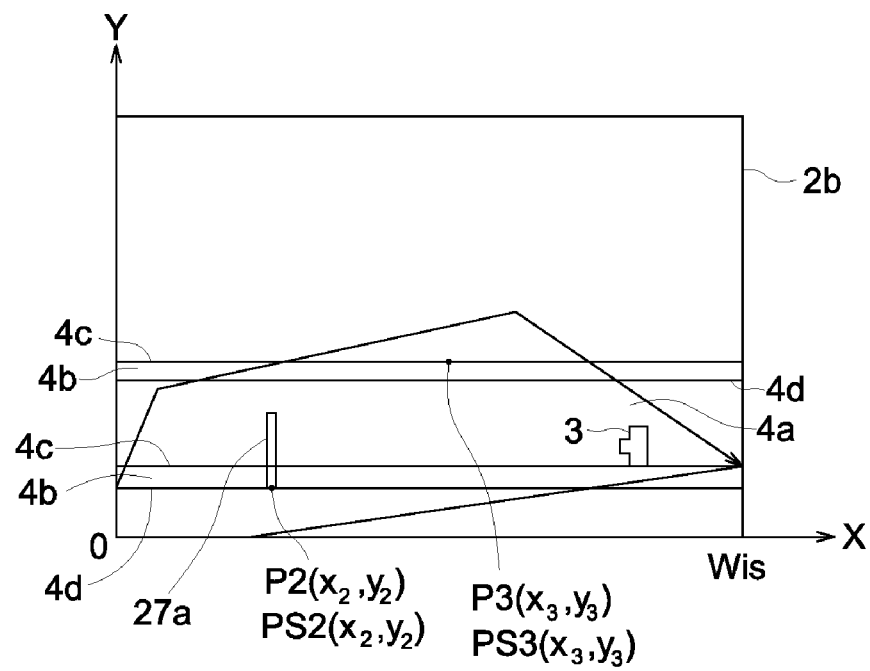
FIG. 16a is a diagram showing the detection band on the image sensor 2b.

FIG. 15 show the orientation of the digital camera 2 with respect to the input surface 4a, and the detection zone 4b, where reference numeral 4c represents the top surface of the detection zone 4b. FIG. 16a shows an image sensor 2b of the digital camera 2 with the calibration tool 27a put on the input surface 4a.

FIG. 16a shows the case where the calibration tool 27a is located at the points P2($x_2$, $y_2$) in the coordinate on the input surface. The coordinate system on the input surface 4a is already described in FIG. 6 and its relevant description. In FIG. 16a there is another coordinate constituted of an X-axis and Y-axis on the surface on the image sensor 2b. The X-axis is on the lower side of the image sensor 2b, the Y-axis is on the left side of the image sensor 2b, and the origin of the coordinate is on the bottom-left corner of the image sensor 2b.

In this embodiment, the calibration tool 27a is used twice to perform the calibration, but the calibration tool 27a may be used more than twice. In the following, description will be done using two points P2 and P3. The points P2($x_2$, $y_2$) and P3($x_3$, $y_3$) correspond to the points PS2($X_2$, $Y_2$) and PS3($X_3$, $Y_3$) in the image coordinate X-Y on the image sensor 2b. In FIG. 16a, two reference numerals 4c represent the upper sides of the detection zone 4b at the points PS2($X_2$, $Y_2$) and PS3($X_3$, $Y_3$). The band width of the detection band 4b is thinner as the point on the image sensor 2b is farther from the X-axis. In particular, the detection band for the point PS3($X_3$, $Y_3$) is thinner than that for the point PS2($X_2$, $Y_2$).

Figure 16B:
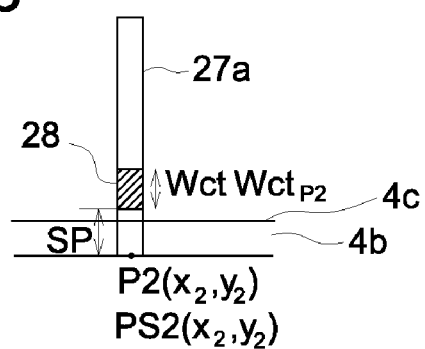
FIG. 16b is a diagram showing an enlarged view of the calibration tool at the point P2.

FIG. 16b shows an enlarged view around the point P2 on the image sensor 2b. In FIG. 16b, Wct is the actual dimension of the dimension indicator 28, and $Wct_{p2}$ is the dimension of the dimension indicator 28 on the image sensor 2b. The actual thickness of the detection zone 4b is 5 mm as mentioned above, and the band width $Bw_{p2}$, for the point P2, of the detection band is calculated by the equation:

$$Bw_{p2}=Wct_{p2}/Wct\times5$$

The lower side 4d of the detection band 4b for the point P2 is then expressed by the equation:

$$Y=Y_2 \qquad \text{equation (5)}$$

The upper side 4c of the detection band 4b for the point P2 is then expressed by the equation:

$$Y=Y_2+Bw_{p2}=Y_2+Wct_{p2}/Wct\times5 \qquad \text{equation (6)}$$

The area between the lines defined by the equations (5) and (6) is the detection band 4b for the object approaching a point on the line passing the point P2($X_2$, $Y_2$) and being parallel to X-axis.

Similarly, the width $Bw_{p3}$ of the detection band for the position P3 is calculated from the dimension $Wct_3$ of the dimension indicator 28 on the image sensor 2b by the equation:

$$Bw_{p3}=Wct_{p3}/Wct\times5$$

The lower side 4d of the detection band 4b for the position P3 is then expressed by the equation:

$$Y=Y_3 \qquad \text{equation (7)}$$

The upper side 4c of the detection band 4b for the position P3 is then expressed by the equation:

$$Y=Y_3+Bw_{p3}=Y_2+Wct_{p3}/Wct\times5 \qquad \text{equation (8)}$$

where $Wct_{p3}$ is the dimension of the dimension indicator 28 on the image sensor 2b.

The area between the lines defined by the equations (7) and (8) is the detection band 4b for the object approaching a point on the line passing the position P3($X_3$, $Y_3$) and being parallel to X-axis.

<Calibration Flow>

The calibration flow will be described below here with reference to a flowchart of FIG. 17 and the screen view of FIG. 18.

Figure 17:
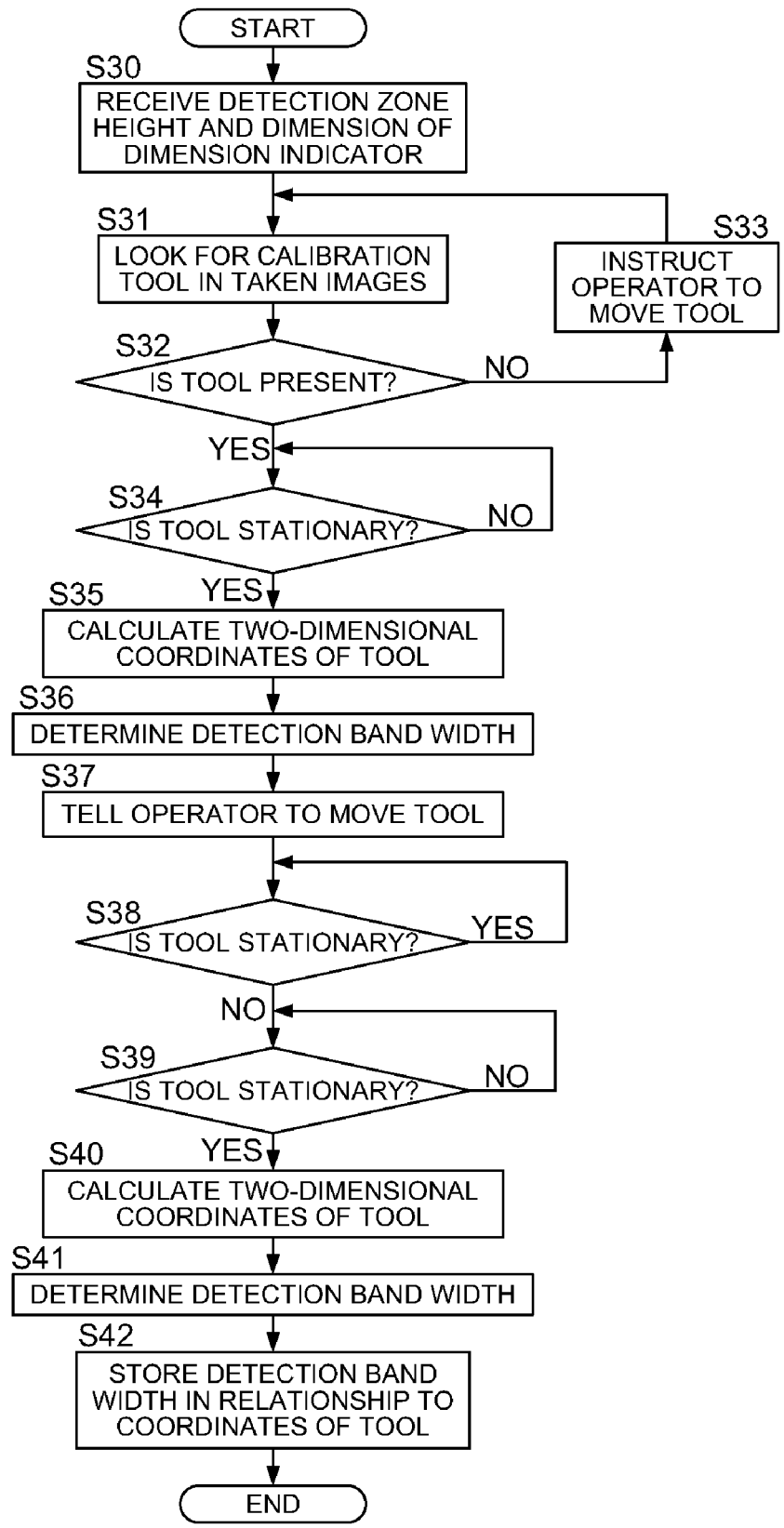
FIG. 17 is a diagram showing a flowchart of a calibration program of the first embodiment of the present invention.

In FIG. 17, when a calibration program starts, the thickness of the detection zone 4b and the dimension of the dimension indicator member 28 are inputted to the PC 31 (step S30), and the digital cameras 2 and 3 start to take images simultaneously to find the calibration tool 27a (step S31). If the calibration tool 27a is not present in the taken images (step S32, No), the flow goes to step S33 to instruct the operator to move the calibration tool 27a, and returns to step S31. If the calibration tool 27a is present in the taken images (step S32, Yes), the flow goes to step S32 to wait for the calibration tool 27a to stop moving (step S34). If the calibration too 27a is stationary (step S34 Yes), the flow goes to step S35 and calculate the two-dimensional coordinates of the calibration tool 27a, and determines the position and the width of the detection band for the location where the calibration tool currently exists (step S36). At step S37, the PC 31 tells the operator to move the calibration tool 27a to the second position, and wait for the calibration tool 27a to move (step S38) and to stop again (step S39). When the calibration tool 27a stops again (step S39, Yes), the PC 31 (CPU 91) calculate the two-dimensional coordinates of the location where the calibration tool 27a currently exists (step S40), and determines the position and the width of the detection band for the location where the calibration tool currently exists (step S41). At step S42, the positions and the widths of the detection band are stored in the hard disk drive 97 in relationship to the locations.

Figure 18:
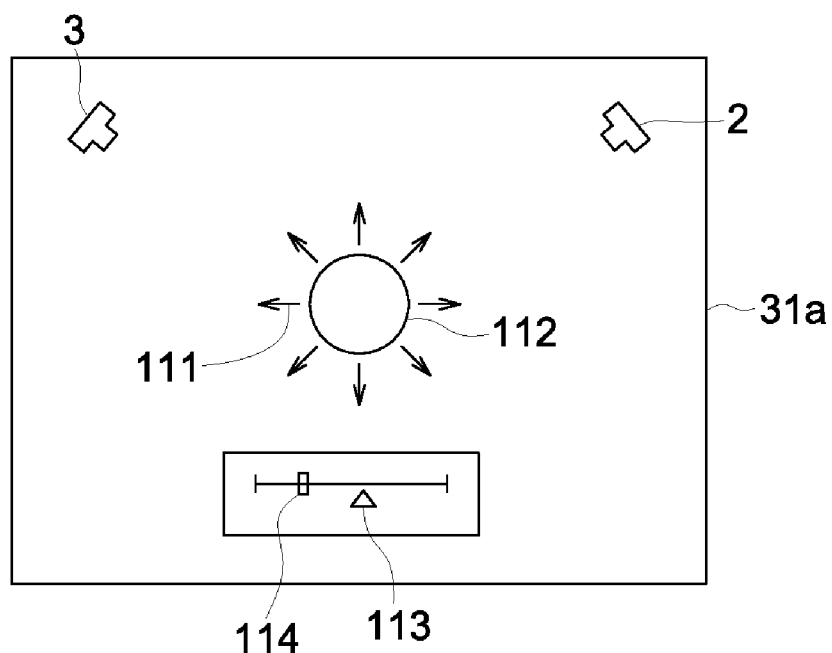
FIG. 18 is a diagram showing a screen view when the calibration program runs.

FIG. 18 shows an example of a view of the display screen 31a which is used to instruct the operator how to move the calibration tool 27a when the calibration program is running. In FIG. 18, the reference numeral 111 denotes the instruction arrows one of which is selectively displayed to instruct the operator in which direction to move the calibration tool 27a. The circle 112 is displayed to tell whether the calibration tool 27a is in the viewing field of the digital cameras 2 and 3 or to tell whether the calibration tool is exactly at the desired place. When the circle is red, the calibration tool 27a is out of the viewing field, and when green, the calibration tool 27a is in the viewing field. The indicator 113 indicates the target position, and the indicator 114 indicates the current position. The operator is supposed to move the calibration tool 27a so that the indicator 114 meets the indicator 113.

<Calibration of the Detection Band in the Case of a Non-Zero Roll Angle>

Here will be described a method for calibrating the detection band, when the roll angles and pitch angles are not zero. In this method, the following conditions are needed:

1. The yaw angles must be adjusted properly before this procedure is used. This is required in order to calculate the correct coordinates for the calibration positions;
2. The calibration position, at which the calibration tool is placed to perform the calibration, is preferably close to the optical axis of the digital camera. The accuracy of the slope measurement is higher at the point closer to the optical axis;
3. The base line length between the two digital cameras must be measured. This is required in order to calculate the correct coordinates for the calibration positions.

The calibration procedure of this method makes the following assumptions:

1. The portable input device of this embodiment is used as a touch panel to obtain the location on the surface for all points in the input area on the panel;
2. The physical spacing of pixels on a pixel line and the spacing between lines is the same (this assumption is just for easy understanding);
3. The optical system is designed such that the angle formed by a pixel projected onto the input surface with respect to the lens is the same for all pixels of the image sensor. This type of lens is known as an f-θ lens.

Figure 30:
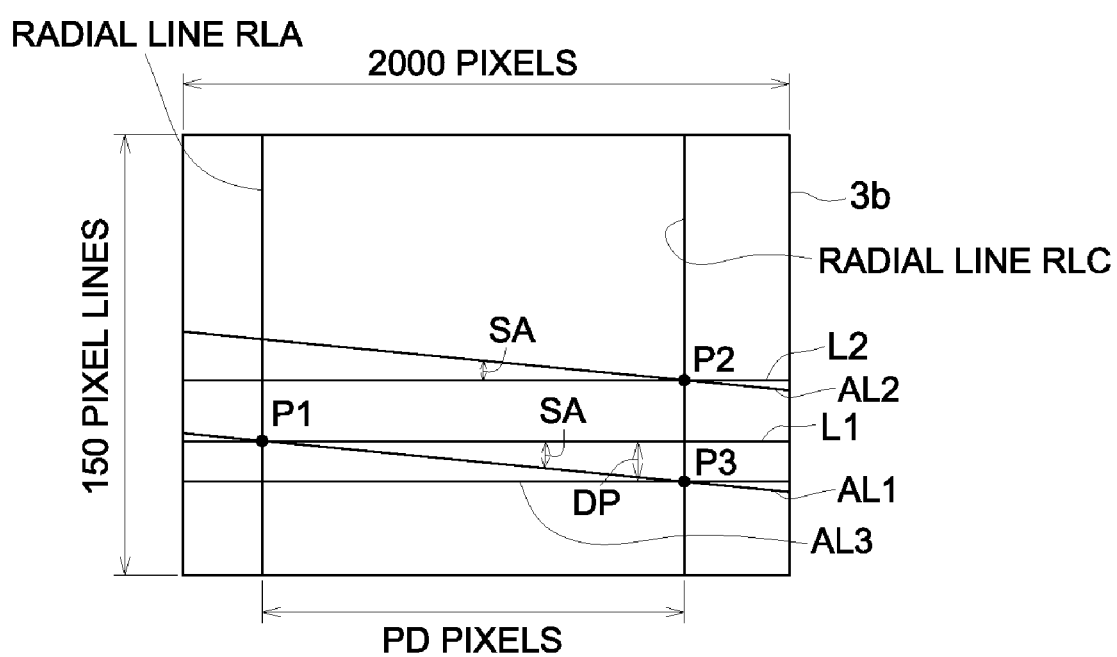
FIG. 30 is a diagram showing the parameters on the image sensor 3b for calibrating the detection band in the case of a non-zero roll angle.
Figure 31:
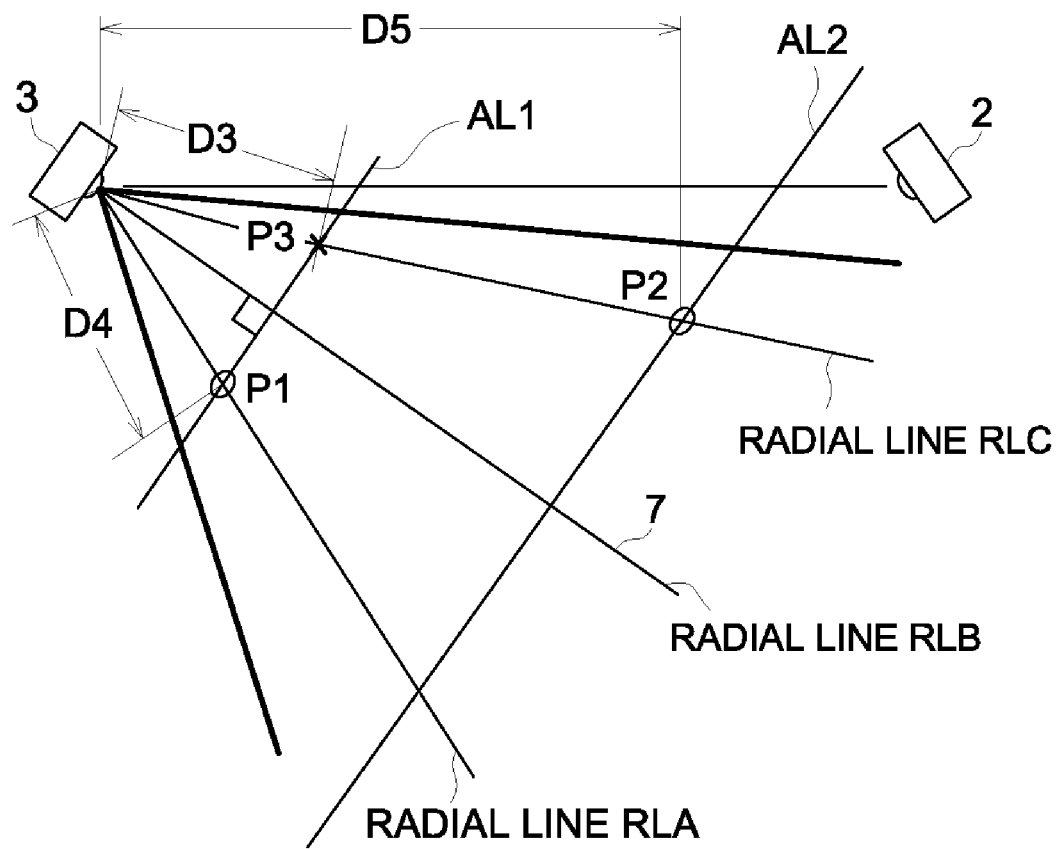
FIGS. 31 and 32 are diagrams showing the positional relationship between the digital camera 2 and the calibration points P1 and P2.

In the following description, the calibration is performed based on two calibration positions P1 and P2 as shown in FIGS. 30 and 31. FIG. 30 shows the surface of the image sensor 3b of the digital camera 3. The image sensor 3b has 2000×1500 pixels, whose lateral pitch and vertical pitch are identical. FIG. 31 shows the positional relationship between the digital camera 3 and the calibration positions P1 and P2. Calibration position P1 is located on a pixel line L1 in the image sensor 3b (see FIG. 30) and is a known distance D4 from the digital camera 3 (see FIG. 31, where D4 is calculated from the coordinates of the calibration position P1 obtained by the portable input device 1). A calibration position P2 is located on a pixel line L2 in the image sensor 3b (see FIG. 30) and is a known distance D5 from the digital camera 3 (see FIG. 31, where D5 is calculated from the coordinates of the calibration position P2 obtained by the portable input device 1). An angular line AL1 and an angular line AL2 are on the input surface 4a and perpendicular to the optical axis 7, and respectively go through the calibration positions P1 and P2. The angular lines AL1 and AL2 correspond to angular lines AL1 and AL2 in FIG. 30, respectively.

The roll angle SA of the digital camera 3 is measured as an angle formed between the pixel line and the image of the calibration tool 27a placed on the input surface 4a, where the calibration tool 27a is perpendicular to the input surface 4a. In this situation, assume that a position P3 is on the same angular line AL1 (See FIG. 31) as the calibration position P1, and on pixel line L3 (see FIG. 30), then the location of pixel line L3 will be determined as follows. In FIG. 31, a radial line RLA, radial line RLB, and radial line RLC denote the lines of intersections between the input surface 4a and the planes each of which is parallel to the right or left side line of the surface of the image sensor 3b, goes through the lens center and contains the calibration position P1, the optical axis 7, and the position P3, respectively. The distance between the radial line RLA and radial line RLC in pixels is assumed to be PD pixels, which is measured on an image taken by the digital camera 3 (see FIG. 30). The number of pixel lines between P1 and P3 is defined as DP and will be determined later.

Based on the information in FIG. 30, the following equations are made:

$$\tan(SA)=DP/PD$$

$$\text{or } DP=\tan(SA)\times PD \quad\quad \text{equation (9)}$$

The pixel line at P3 is L3=P1−DP, and substituting equation (9) for DP, the following equation is made;

$$L3=P1-\tan(SA)\times PD \quad\quad \text{equation (10)}$$

Figure 32:
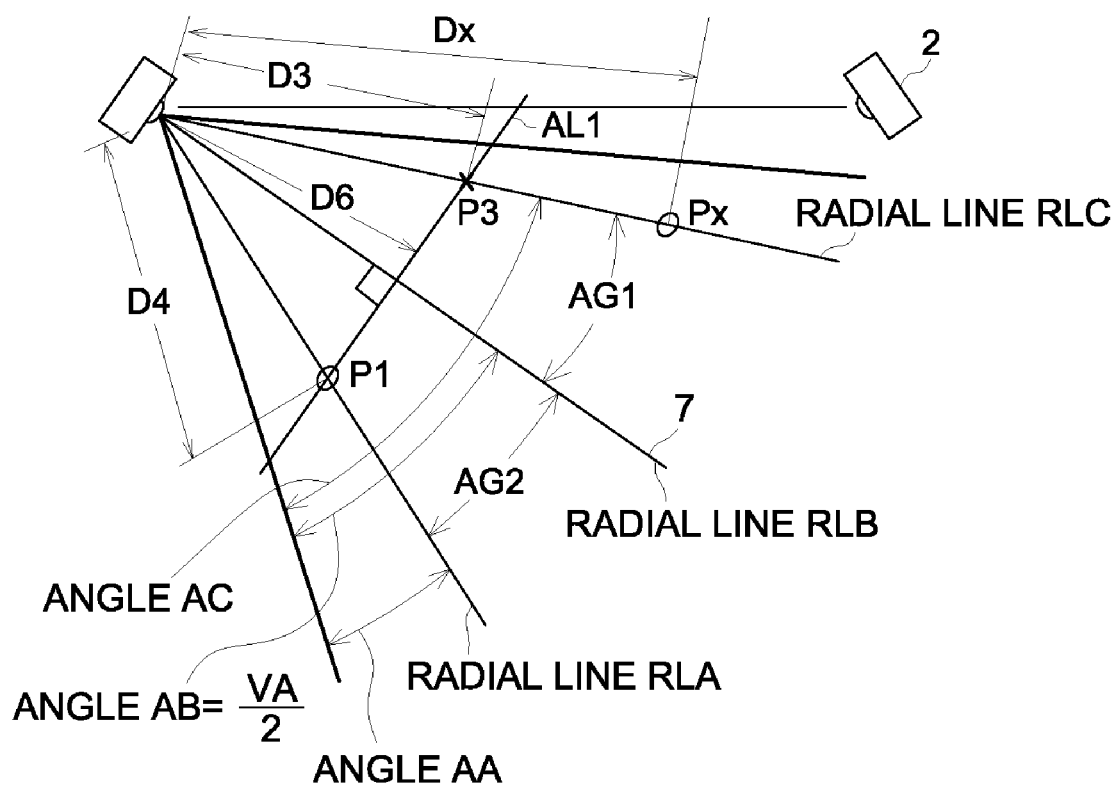

Next, the distance D3 between the digital camera 3 and P3 will be determined. FIG. 32 depicts the angular parameters AG1, AG2 and D6 where AG1=angle AC−VA/2 and AG2=VA/2−angle A.

D6 can be calculated from the equations;

$$\cos(AG2)=D6/D4$$

$$\text{or } D6=D4\times\cos(AG2)$$

D3 can be calculated by the equation;

$$\cos(AG1)=D6/D3$$

$$\text{or } D3=D6/\cos(AG1)$$

The number of pixel lines between P2 and P3 and the physical distance between these two points on the input surface 4a specifies the pixel resolution (lines/cm) PR along any radial line, assuming the distances in pixel between the bottom side of the image sensor 3b and the line L2, the bottom side of the image sensor 3b and the line L3 as l2 and l3, respectively, by the equation:

$$PR=(l2-l3)/(D2-D3)$$

This is a constant value anywhere on the input surface based on the assumption specified at the beginning of this chapter.

The pixel line Lx (which is lx pixels from the bottom side of the image sensor 3b), for different coordinate locations Px on the input surface 4a and on the radial line RLC, with a corresponding distance DX from the camera, can be calculated from the following equation;

$$lx=l3+(Dx-D3)\times PR$$

This equation can be used for any camera viewing angle by substituting a distance lr between the bottom side of the image sensor 3b and a different reference pixel line Lr, and the distance Dr for D3.

$$lx=lr+(Dx-Dr)*PR$$

The values of lr and Dr are a function of the camera viewing angle. The point where Lr and Dr change, from a certain pixel line to the next pixel line, can be determined as follows. Assume the image sensor pixel lines are projected onto the surface of the panel. If a line perpendicular to the optical axis of the camera is drawn on the panel, this line will cross the projected pixel lines. Each time the line crosses a new pixel line, the reference values lr and Dr change. The change in the camera viewing angle between two adjacent crossing points needs to be known. This angular change Ax which is a function of the roll angle is defined as SA.

Figure 33:
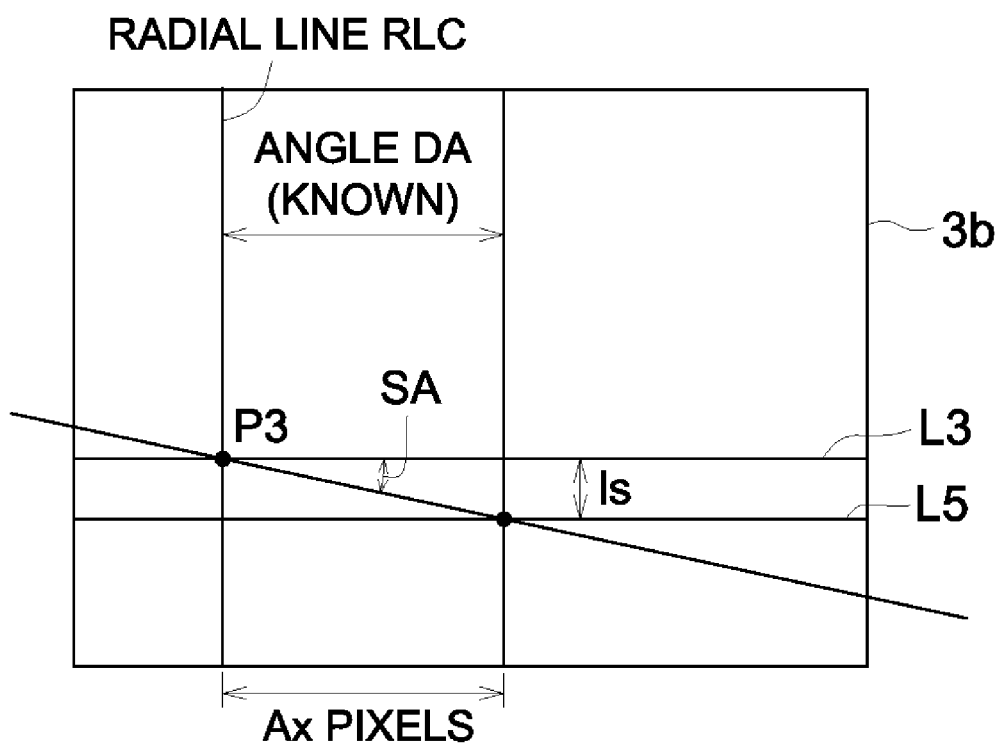
FIG. 33 is a diagram showing the relationship between PD, SA, and the calibration points P1 and P3.

FIG. 33 illustrates this angular change Ax in terms of pixels along a pixel line and the spacing is between pixel lines L3 and L5, where the line L5 is one pixel line below the line L3. From FIG. 33 the equation is made as follows:

$$\tan(SA) = ls/Ax$$

or $Ax = ls/\tan(SA)$

Given the original reference point P3, the reference line Lr and reference distance Dr has to change if the viewing angle C changes by Ax pixels.

The new reference distance Dr can be calculated as follows.

Figure 34:
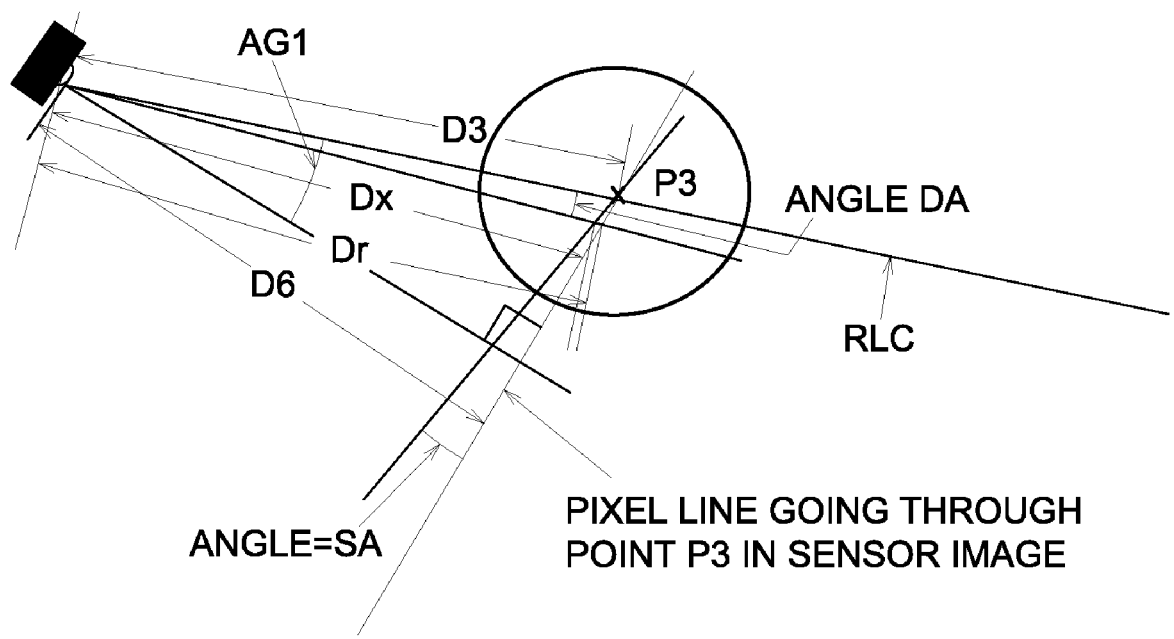
FIG. 34 is a diagram showing the angular relationship between AG1, DA, and SA.
Figure 35:
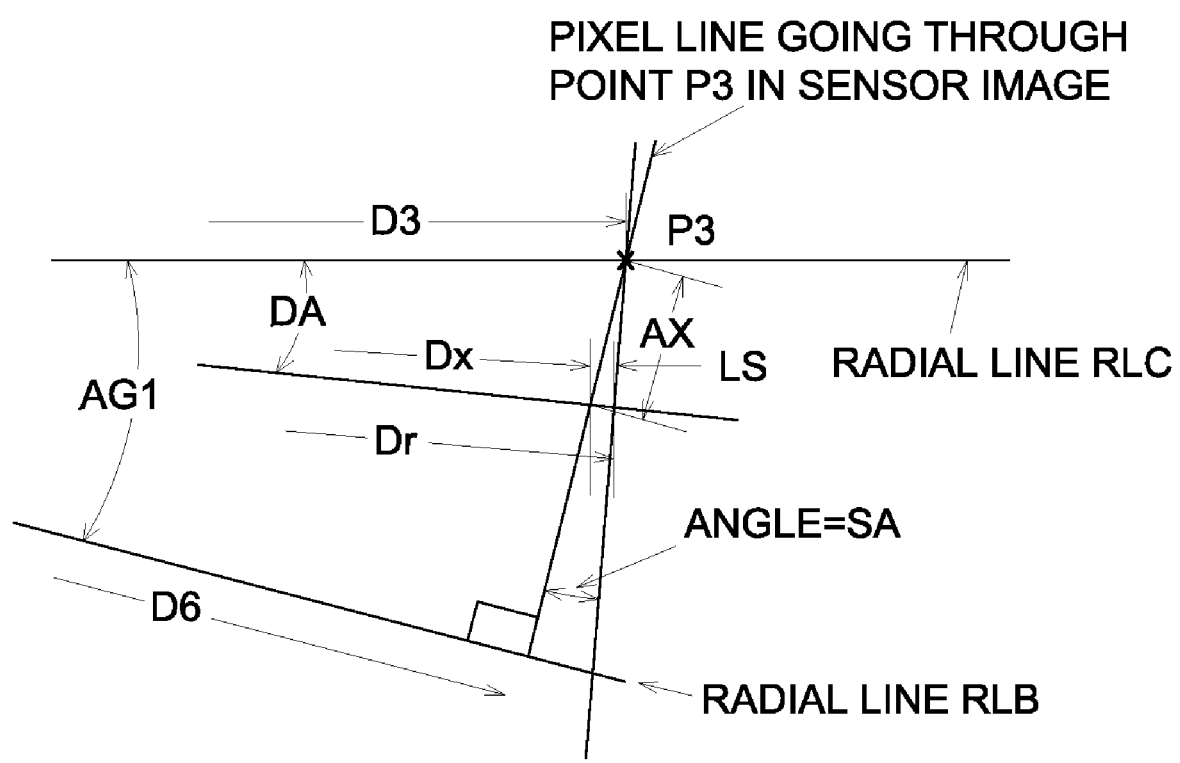
FIG. 35 is an enlarged view of the circled part of FIG. 34.

FIG. 33 illustrates the actual angular change in the viewing angle as DA in pixel. FIGS. 34 and 35 show this angle and the physical distance Ax as it would appear on the panel. These figures also refer to AG1 and D6 which was shown in FIG. 32. From FIGS. 34 and 35, the following equations are made:

$$\cos(AG1 - DA) = D6/Dx$$

or $Dx = D6/\cos(AG1 - DA)$

The new Dr is therefore $$Dr = Dx + ls$$

The above calculations can be used to create a table with values for lr and Dr covering the complete input area for this embodiment. Assuming P3 is used as the original reference point the following table provides an example. Table 1 can be stored in the Hard disk drive 96 of the PC 31.

TABLE 1

| Camera viewing angle range | lr | Dr (calculated) |
|---|---|---|
| ... | ... | ... |
| C − 2*AX +/− (Ax/2) | l3 + 2 | Dr (n − 2) |
| C − AX +/− (Ax/2) | l3 + 1 | Dr (n − 1) |
| C +/− (Ax/2) | l3 | D3 |
| C + AX +/− (Ax/2) | l3 − 1 | Dr (n + 1) |
| C + 2*AX +/− (Ax/2) | l3 − 2 | Dr (n + 2) |
| ... | ... | ... |

The followings should be noted:
1. The procedure causes the angle of viewing field of each digital camera to be divided into angular segments.
2. An equation is defined for each angular segment which can be used to determine the location of the detection band as a function of the distance from the digital camera.

In addition, since two calibration positions are used
1. Any one of the calibration positions is available as the reference point.
2. The same calculations for all calibration positions can be performed, and an algorithm that combines the data from all calibration positions can be defined. (Averaging the roll angle measurements, averaging resolution calculations, calculate a different reference angle (A was used in this process) other than the angle of one of the calibration positions, compensate for optical characteristics of the system.)

If the roll angle is zero and the pitch angle non-zero, then the detection band location would only be dependent on the distance from the plane including the surface of the image sensor. The pixel lines making up the detection band would be affected by the vertical angular location of the image of the object on the image sensor.

If the pitch angle is zero, the roll angle non-zero and the height of the optical axis above the panel is zero, then the detection band location would be independent of the distance from the camera. The pixel lines making up the detection band would only depend on the angular location of the image of the object on the image sensor.

In the description above, the width of the detection band is not discussed. The width of the detection band depends on the coordinates of the location on the input surface, and it can be calibrated by known method. Further, the lens type is assumed as f-θ lens in the above discussion, but this is just for easy understanding, and a normal type lens can be available for the embodiment, and the detection band can be calibrated in a similar way.

<How to Use the Detection Band>

When the portable input device 1 of the present invention is in operation, the digital cameras 2 and 3 each take images at a rate of 30 images per one second, and the taken images are captured by the PC 31 into the RAM 94. As for the captured images for each digital camera, one image is compared with its succeeding image to find some object to come into the viewing field of the concerned digital camera. When an object is detected in the viewing field, the coordinates of the object are calculated assuming the object to be on the input surface 4a, using the above-described method. Then, the obtained coordinates are used to decide which detection band to be used to detect whether the object is in the detection band. This process from the detection of an object coming into the viewing field to the detection of the object entering the detection band is cyclically performed.

<How to Map the Computer Screen to the Input Area>

There are several ways to map the input area to the computer display screen, and configuration programs are used for that purpose.

Figure 20:
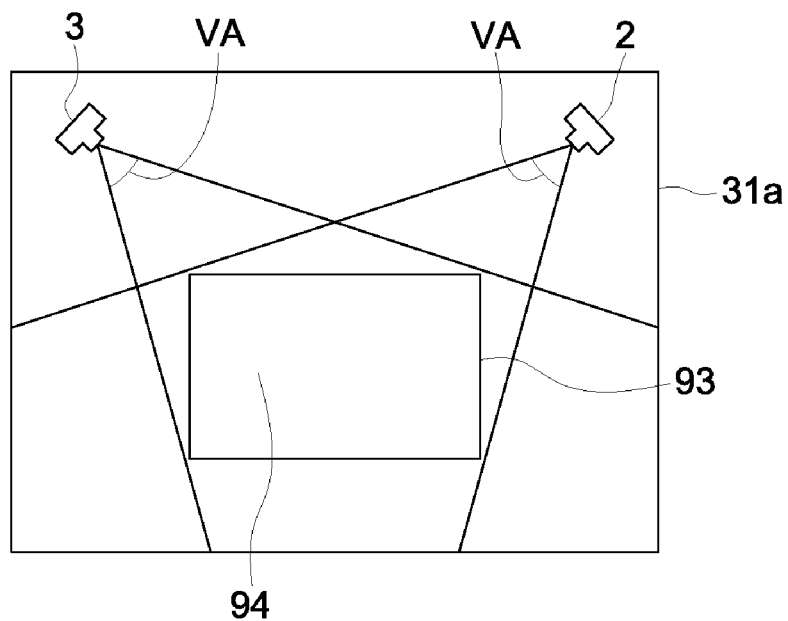
FIG. 20 is a diagram showing the display screen 31a when the configuration program runs.

First, an automatic mapping method will be described. In this method, the configuration program automatically assigns the four corners of the display screen 31a to appropriate four points on the input surface 4a, which four points define the input area having the same aspect ratio as the display screen 31a. As shown in FIG. 20, the configuration program displays the positional relationship between the input area 93, two digital cameras 2 and 3, and their viewing fields, on the display screen 31a. In this situation, when the operator puts some object or his or her finger on the input surface 4a, an indication mark 94 is displayed in the input area 93, and the indication mark 94 moves as the operator moves the object or the finger on the input surface 4a. Thus, the operator sees where on the input surface 4a the input area 93 is defined.

Figure 21:
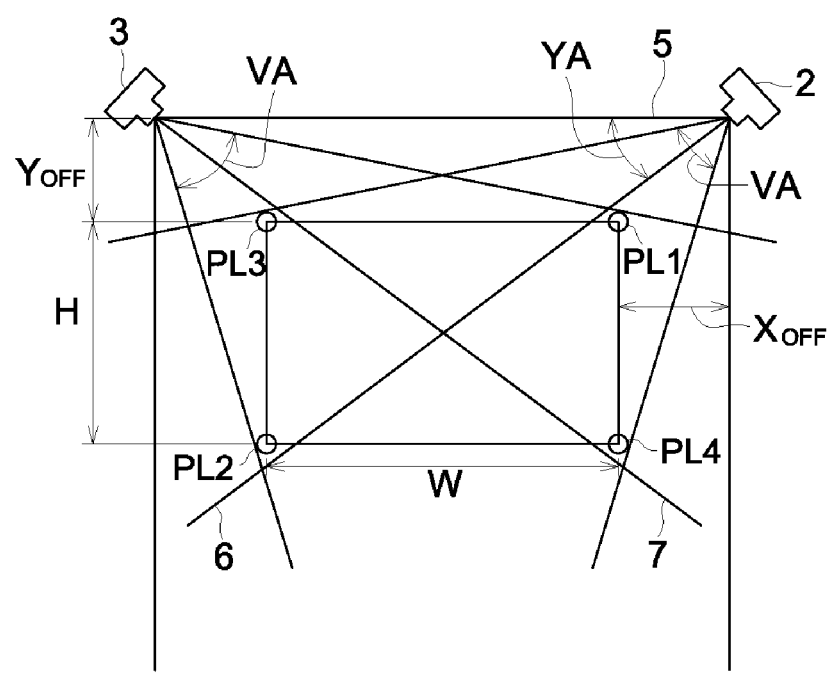
FIG. 21 is a diagram showing the relation ship between the values used for automatic mapping.
Figure 22:
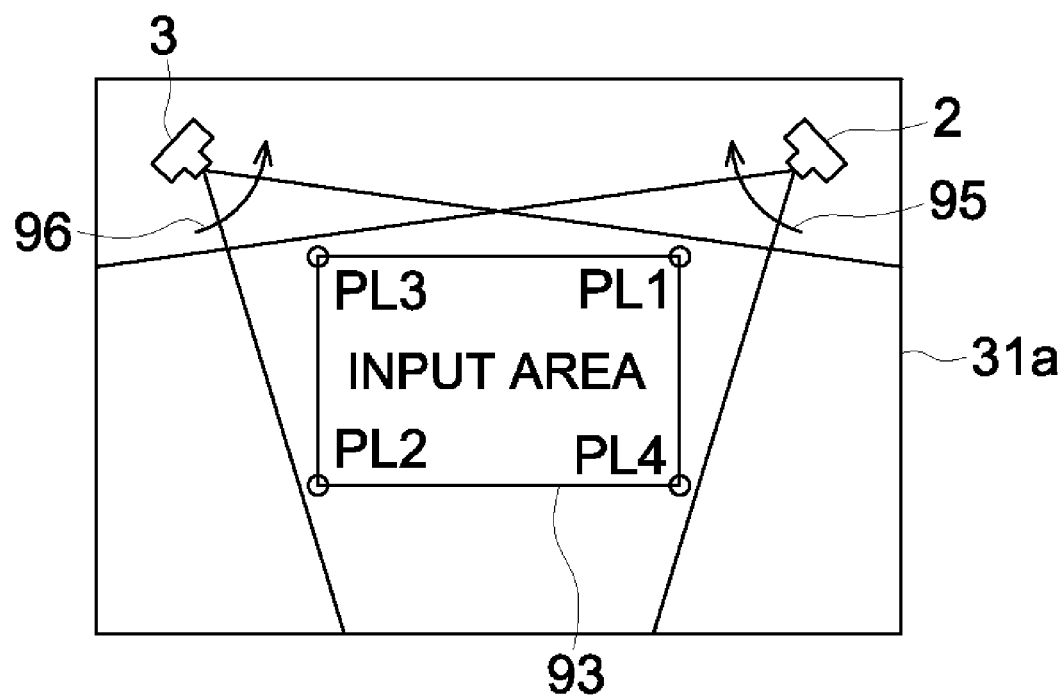
FIG. 22 is a diagram showing the display screen 31a when mapping a fixed size input area.

Second, there will be described a case where a fixed input area 93 is mapped to the display screen 31a (see FIGS. 20 to 22). In the method to be described below, the orientation of the digital cameras 2 and 3 is also adjusted, where the yaw angles of the two digital cameras 2 and 3 have the same value of YA, and their viewing angles VA are less then 90°. The optimal positional relationship between the digital cameras 2 and 3 and the input area 93 is defined by the following equations (see FIG. 21):

$$\tan(YA - VA/2) = Y_{off}/(W + 2 \cdot X_{OFF})$$

$$\tan(90 - YA - VA/2) = X/(H + Y_{OFF})$$

where:
$X_{OFF}$ is a distance between the lateral side of the input area 93 and the line which passes though the digital camera 2 and is perpendicular to the base line 5;
$Y_{OFF}$ is a distance between the upper side of the input area 93 and the base line 5;
H is a height of the input area 93; and
W is a width of the input area 93.

The operator will be instructed to input the dimensions H and W of the input area 93 and a preferable yaw angle YA when the configuration program starts. The PC 31 calculates and informs the operator of the values $X_{OFF}$ and $Y_{OFF}$. The operator is instructed to place the digital cameras 2 and 3 having the distance of $X_{OFF}$ and $Y_{OFF}$ with respect to the input area 93, with the lenses 2a and 3a pointing towards each other and then place the tool in specific locations PL1 through PL4 that the interactive computer program uses as reference points when instructing the operator how to rotate the digital cameras 2, 3 and define the corners of input area. The tool used for mapping, can be any available object as long as it can be visually recognized in images taken by the digital cameras 2 and 3. FIG. 22 is an example of the type of interactive PC display that is used to assist the operator for the yaw alignment of the digital cameras 2 and 3. The operator is able to map 100% of the input area to the display screen 31a, adjusting the yaw angles of the digital cameras 2 and 3 following the indication of the arrows 95 and 96.

Figure 23:
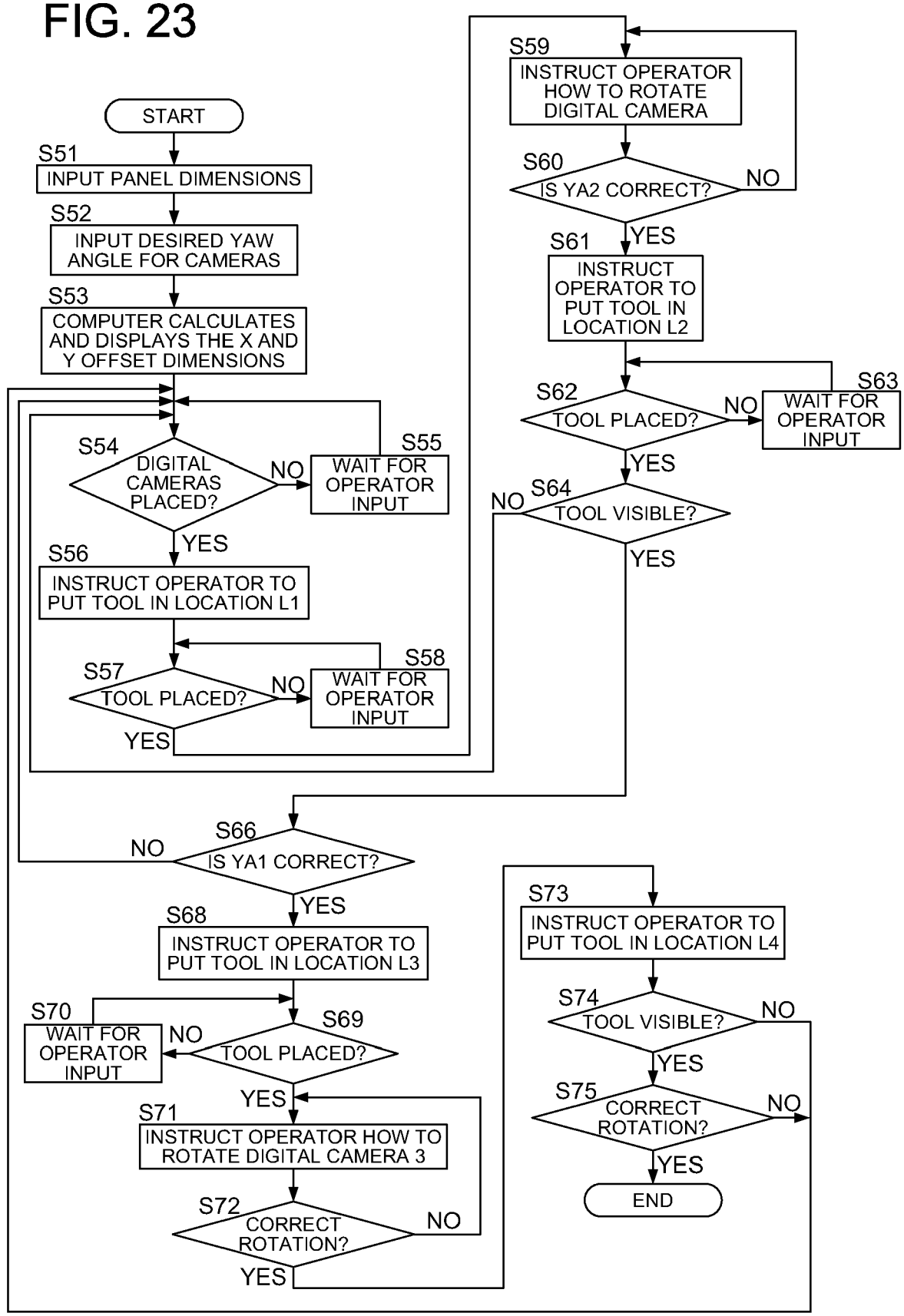
FIG. 23 is a diagram showing a flowchart of a mapping program.

FIG. 23 shows a flowchart of a mapping program used for the above-described method. When the program starts, the PC 31 receives the panel dimensions W and H (step S51) and the yaw angle YA for the display screen 31a (step S52), and calculates and displays $X_{OFF}$ and $Y_{OFF}$ (step S53). At step S54, the PC 31 checks whether the digital camera 2 and 3 are located in place by checking the result of the operator's input at step S55. If the digital cameras 2 and 3 are in place (step S54, Yes), the flow goes to step S56, but if No at step S54, the flow repeats step S54. At step S56, the PC 31 instructs the operator to put the tool at the location PL1, and waits until the tool is in place (step S57). At step S57, the presence of the tool is checked by checking the result of the operator's input at step S58. When the tool is in place (step S57, Yes), the flow goes to step S59 and instructs the operator how to rotate the digital camera 3. At step S59, the digital camera 3 starts taking images. At step S60, the PC 31 check based on the taken images whether the yaw angle YA2 is correct, and if YA2 is correct (step S60, Yes), the flow goes to step S61. If No at step S60, the flow goes back to step S59. At step S61, the PC 31 instructs the operator to put the tool at the location PL2. At step S62, the PC 31 waits for the tool to be placed in place, and when the tool is in place (step S62, Yes), the flow goes to step S64. At step S64, the PC 31 checks based on the taken images whether the tool at the location PL2 is visible. If the tool is visible (step S64, Yes), the flow goes to step S66, but if No at step S63, the flow goes back to S54 for relocation of the digital camera 3. AT step S66, the PC 31 checks whether YA2 is correct. If YA2 is correct (step S66, Yes), the flow goes to step S68, but if No at step S66, the flow goes back to step S54 for relocation of the digital camera 3. At step S69, the PC 31 instructs the operator to place the tool at the location PL3, and check whether the tool is in place (step S69). At step S69, the placement of the tool is checked by checking the result of the operator's input at step S70. At step S71, the PC 31 instructs the operator based on the taken images how to rotate the digital camera 2. At step S72, the PC 31 checks based on the taken images whether YA1 is correct. If YA1 is correct, the flow goes to step S73, but if not correct (step S72, No), the flow goes back to step S71. At step S73, the PC 31 instructs the operator to put the tool at the location PL4, and checks whether the tool is present in the taken images. If the tool is present in the taken images, the flow goes to step S75, but if not present (step S74, No), the flow goes back to step S54 for relocation of the digital camera 2. At step S75, the PC 31 checks based on the taken images whether the angle YA1 is correct. If YA1 is correct (step S75, Yes), the flow ends, but if not correct (step S75, No), the flow goes back to step S54 for relocation of the digital camera 2.

Third, there will be described the case where the input area 93 is arbitrarily defined in the overlapping area of the two viewing fields. In this case, the operator has the following options: he can assigned the input area on the input surface 4a to the whole display screen 31a or a part of the display screen 31a; and he can decide whether the aspect ratio of the display screen 31a is used or not.

When a part of the display screen 31a is mapped to the input area 93 on the input surface 4a, the operator must specify a reference point on the display screen 31a that is used when mapping the input area 93 on the input surface 4a to the display screen 31a. The reference point can be the upper left hand corner of the area to be assigned to the input area 93, and the point can be specified by using the computer mouse or keyboard.

When the aspect ration of the display screen 31a is used as the aspect ratio of the input area 93 on the input surface 4a, only the height or width of the input area 93 on the input surface 4a needs to be specified. The portable input device 1 automatically selects the other dimension and determines the scale factor to use when mapping the input area 93 to the display screen 31a.

When the operator chooses to specify both the width and height of the input area 93 on the input surface 4a instead of using the aspect ratio of the display screen, he or she must also choose the corresponding width and height parameters for the display screen 31a.

The scale factors to be used when mapping the X and Y coordinates to the display screen 31a are a function of the relative dimensions for width and height. When the aspect ratio of the display screen 31a is used to determine one of dimensions of the input area 93 on the input surface 4a, the other dimension of the input area 93 can extend beyond the overlapping area of two viewing fields of the two digital cameras 2 and 3.

Figure 24:
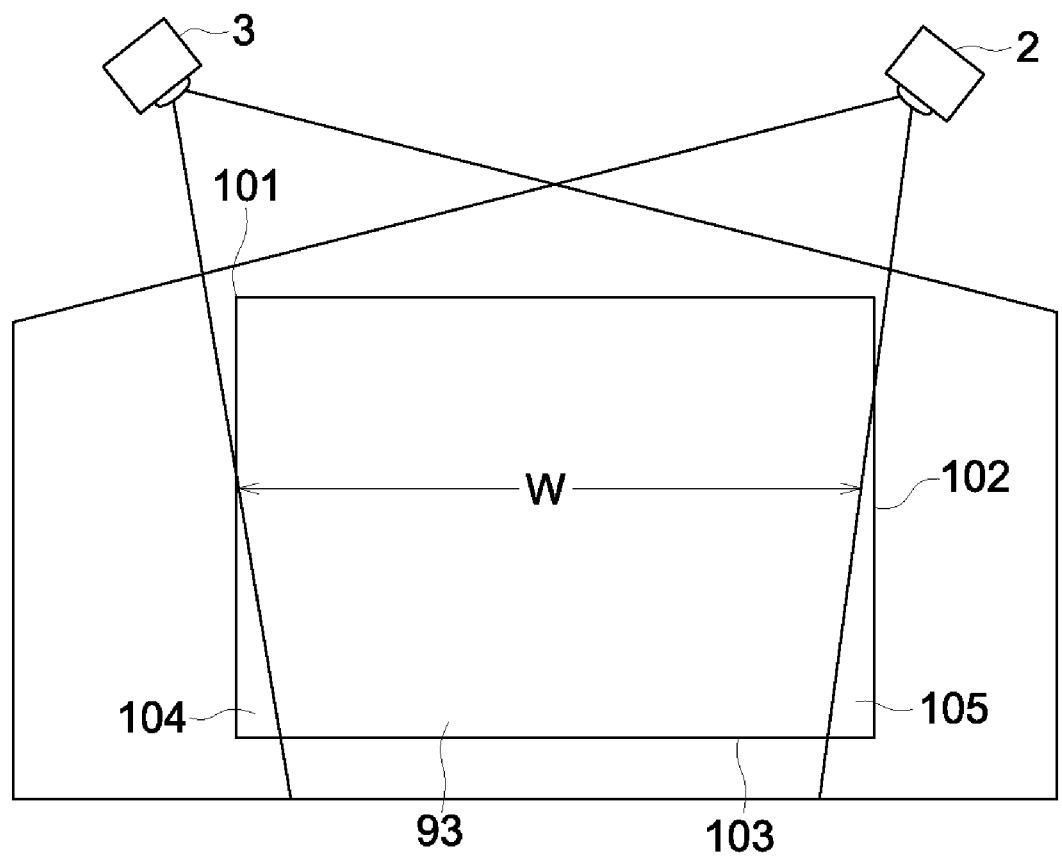
FIGS. 24 and 25 are diagrams showing a case of mapping error.
Figure 25:
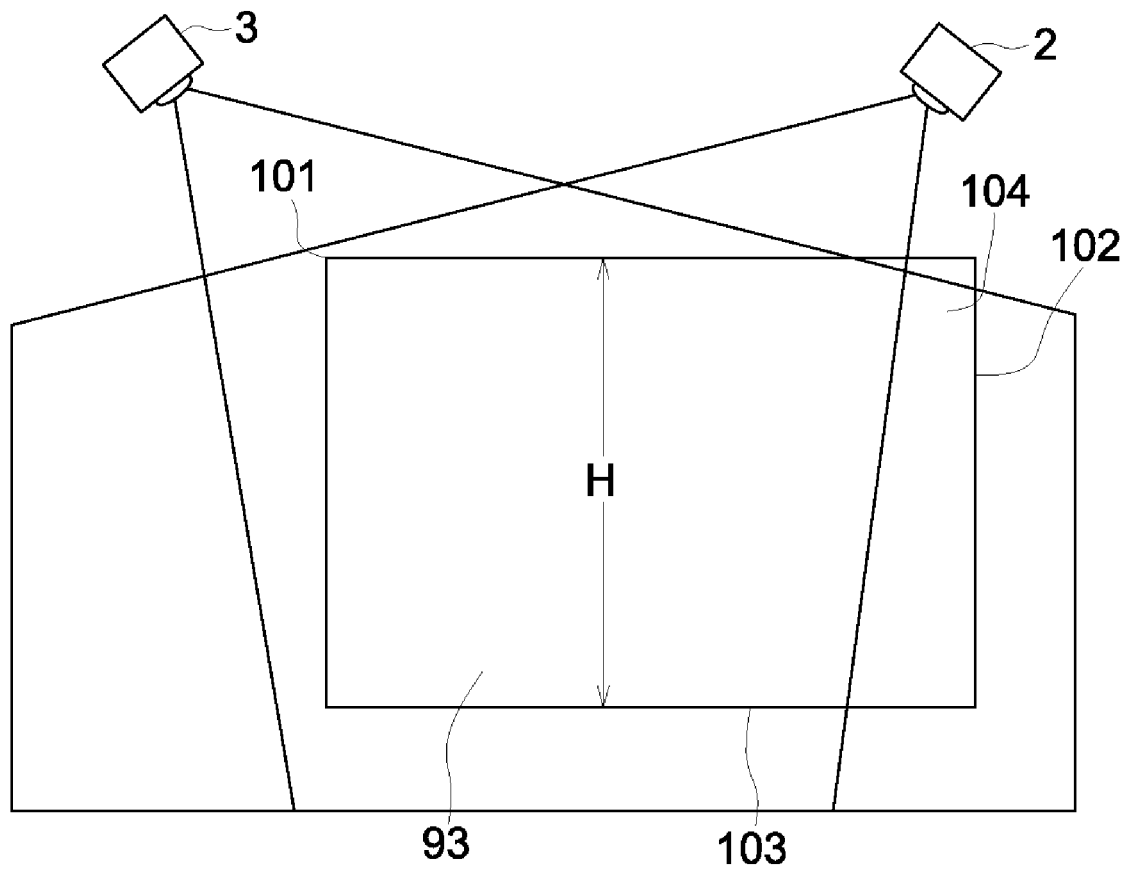

Two examples of this case are shown in FIGS. 24 and 25. FIG. 24 shows the case where the lower two corner portions of the input area 93 extend beyond the overlapping area of the two viewing fields, and FIG. 25 shows the case where the right portion of the input area 93 does. To prevent the operator from creating these situations, the PC 31 can make the display screen 31a display images as shown in FIGS. 24 and 25 which would facilitate the operator to make a correction.

In FIG. 24, the operator has specified the origin 101 and the right hand side 102 of the input area 93. The portable input device 1 determined the location of the bottom side 103 using the aspect ration of the display screen 31a. The figure shows that the lower two corners 104 and 105 of the input area 93 are outside the overlapping area of the two viewing fields of the two digital cameras 2 and 3.

In the case of FIG. 25, the operator has specified the origin 101 and the bottom side 103 or the height of the input area 93. The portable input device 1 determined the location of the right hand side 102 using the aspect ration of the display screen 31a. The figure shows that the right portion 104 of the input area 93 is outside the overlapping area of two viewing fields of the two digital cameras 2 and 3.

Figure 26A:
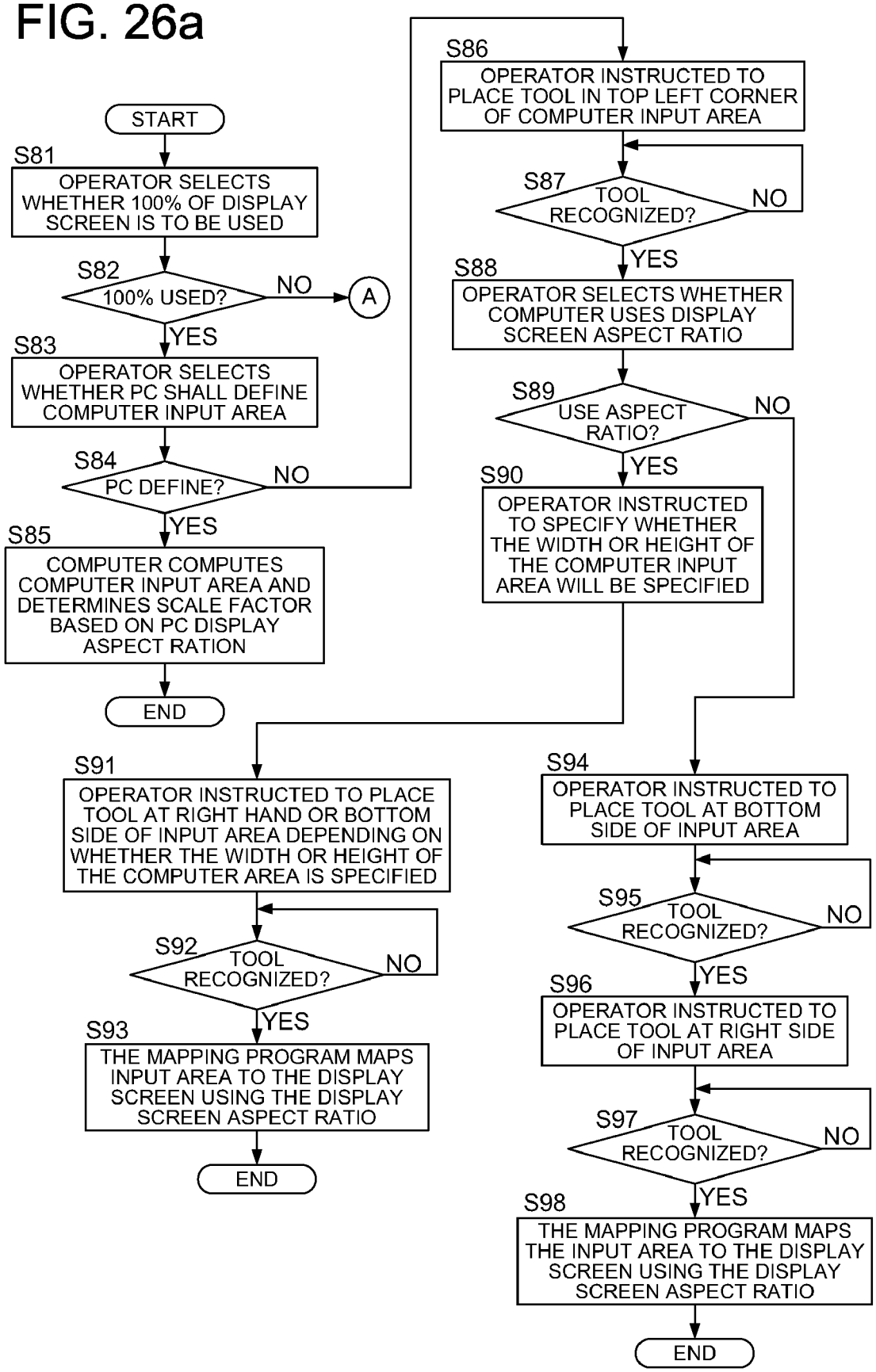
FIGS. 26a and 26b are diagrams showing a flowchart of another mapping program of the first embodiment of the present invention.
Figure 26B:
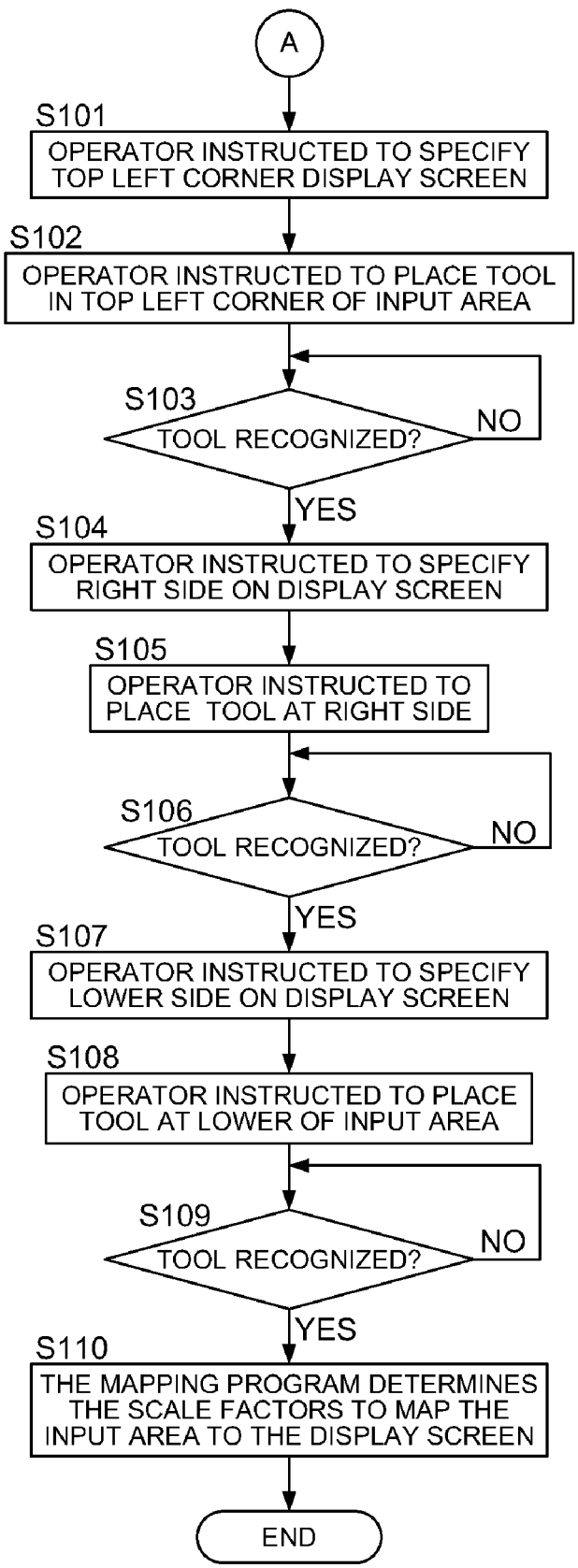
Figure 27B:
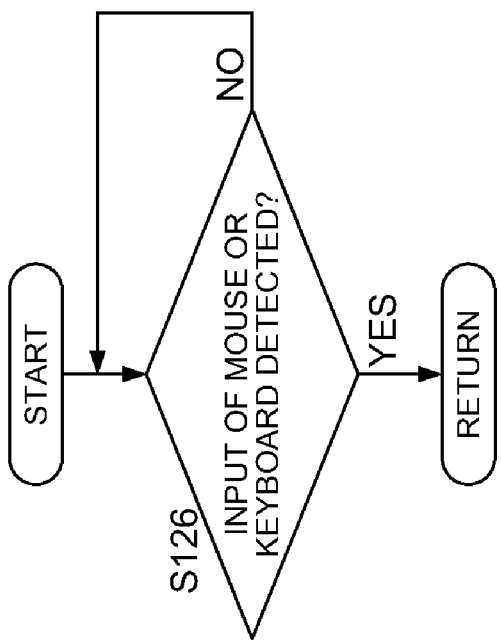
FIGS. 27a and 27b are diagrams showing a flowchart of a subroutine for recognizing the tool.
Figure 27A:
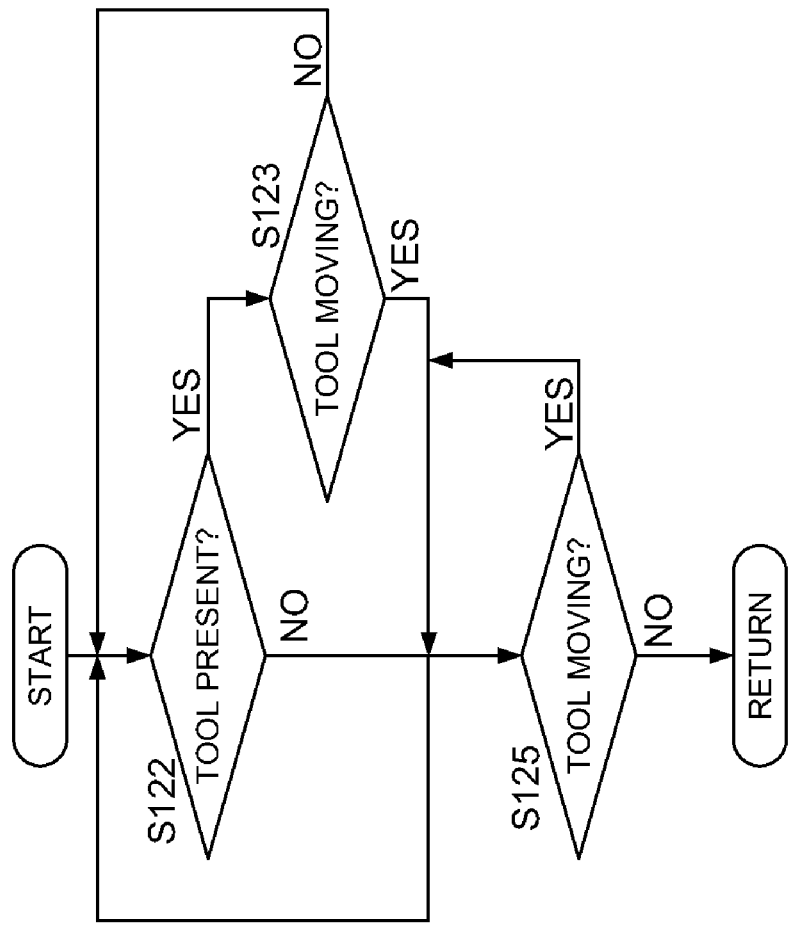

In order to avoid these issues, in the flowchart shown in FIGS. 26a and 26b, it is checked if these issues have occurred (steps S103, S106, and S109). FIGS. 27a and 27b show two implementations of this check. In the case FIG. 27a, no interaction of the operator is required, but the case of FIG. 27b requires the operator to provide an input to the configuration program before a decision can be made.

FIGS. 26a and 26b show a flowchart of another mapping program of the first embodiment. In FIG. 26a, just after the program starts, the operator selects whether 100% of the display screen 31a is to be used (step S81), and if 100% is not used (step S82, No), the flow goes to A of FIG. 26b. If Yes at step S82, the flow goes to step S83, and the operator selects whether the PC 31 shall define the input area 93. If the PC 31 defines (step S84, Yes), the flow goes to step S85, but if No at step S84, the flow goes to step S86.

At step S86, the PC 31 instructs the operator to place the tool at the top-left corner of the input area 93, and the digital cameras 2 and 3 start taking images. At step S87, the flow waits for the tool to be recognized (present in the taken images), and the tool is recognized (step S87, Yes), the flow goes to step S88. At step S88, the operator selects whether the aspect ratio of the display screen 31a is used, and if the aspect ratio is used (step S89, Yes), the flow goes to step S90, but if not to be used (step S89, No), the flow goes to step S94.

At step S90, the PC 31 instructs the operator to specify whether the width or height of the input area 93 will be specified, and at step S91 the PC 31 instructs the operator to place the tool at right hand or bottom side of the input area 93. And the flow waits for the tool to be recognized (present in the taken images) at step S92. If the tool is recognized (step S92, Yes), the flow goes to step S93. At step S93, the input area 93 is mapped to the display screen 31a depending on the aspect ratio of the display screen 31a, and the flow then ends.

At step S94, the PC 31 instructs the operator to place the tool at the bottom side of the input area 93, and waits for the tool to be recognized (present in the taken images) at step S95. If the tool is recognized (step S95, Yes), the flow goes to step S96, and the PC 31 instructs the operator to place the tool at right hand side of the input area 93. At step S97, the flow waits for the tool to be recognized (present in the taken images), and if the tool is recognized (step S97, Yes), the flow goes to step S98. At step S98, the input area 93 is mapped to the display screen 31a depending on the aspect ratio of the display screen, and the flow then ends.

In FIG. 26b, the PC 31 instructs the operator to specify the pixel coordinates of the top left corner of the area of the PC display screen 31a (step S101) that will be used, and to place the tool at the corresponding top left corner of the input area 93 (step S102). At step S103, the flow waits for the tool to be recognized (present in the taken images), and if the tool is recognized (step S103, Yes), the flow goes to step S104. The PC 31 instructs the operator to specify the pixel coordinate of the right edge of the area of the PC display screen 31a (step S104) that will be used, and to place the tool at the right side of the corresponding input area 93 (step S105). At step S106, the flow waits for the tool to be recognized (present in the taken images), and if the tool is recognized (step S106, Yes), the flow goes to step S107. The PC 31 instructs the operator to specify the pixel coordinate of the lower edge of the area of the PC display screen 31a (step S107) that will be used, and to place the tool at the lower side of the corresponding input area 93 (step S108). At step S109, the flow waits for the tool recognized (present in the taken images), and if the tool is recognized (step S109, Yes), the flow goes to step S110. At step S110, the scale factors are determined to map the input area 93 to the display screen, and the flows then ends.

FIGS. 27a and 27b show flowcharts of the subroutines for recognizing the tool. In FIG. 27a, the flow waits for the tool to be present in the taken images, and if present (step S122, Yes), the flow goes to step S123 to check whether the tool is moving. If the too is not moving (step S123, No), the flow goes to step S122, but if moving (step S123, Yes), the flow goes to step S125. If the tool is not present (step S122, No), then the flow repeat step S122. At step S125, the flow wait for the tool to stop, and if the tool is moving (step S125, Yes), the flow repeats step S125. If the tool is not moving (step S125, No), then the flow returns.

In FIG. 27b, at step S126, the flow waits for the input of the mouse or keyboard to occur. If the input is not detected (step S126, No), the flow repeats step S126, but if the input detected (step S126, Yes), then the flow returns.

Figure 28:
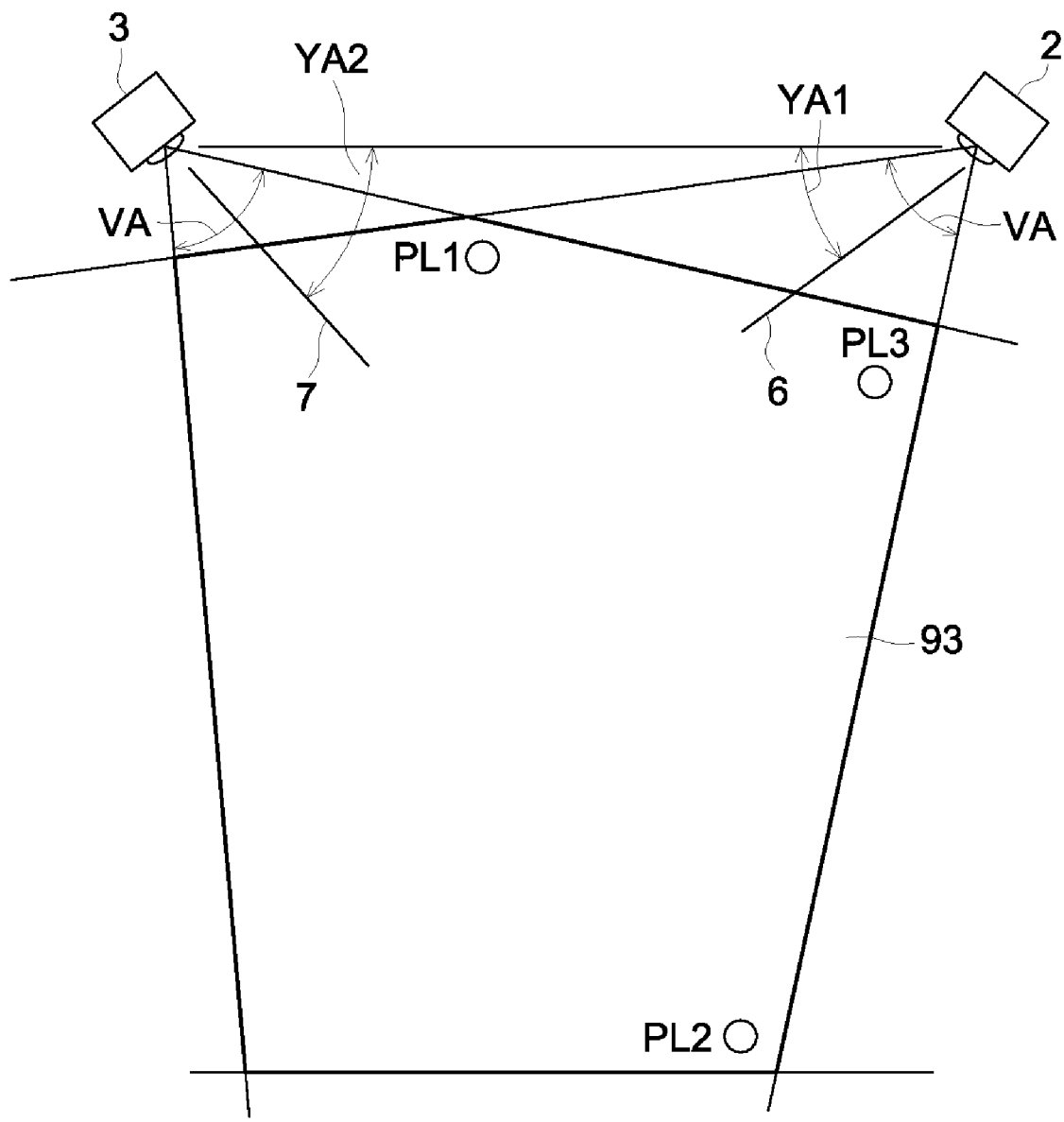
FIG. 28 is a diagram showing the actual overlapping area of the viewing field when the yaw angles are different.
Figure 29:
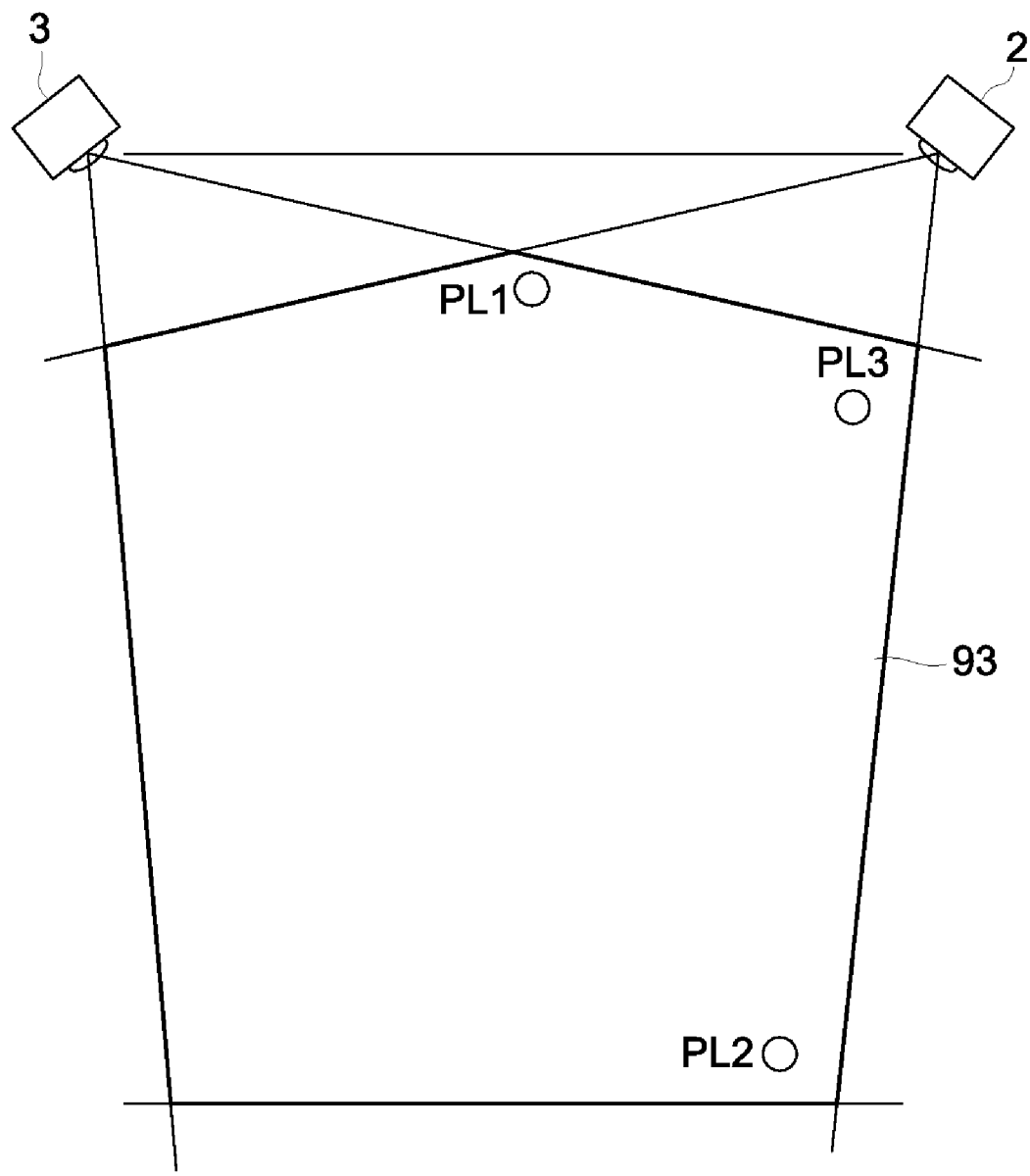
FIG. 29 is a diagram showing the overlapping area of the viewing field on the display screen.

In some cases, although the input area may be asymmetric because of different yaw angles, the portable input device 1 calculate the input coordinates assuming that the yaw angles of the two digital cameras 2 and 3 are the same. FIGS. 28 and 29 show the situation of those cases. FIG. 28 shows the shape of the overlapping area of the two viewing field, and FIG. 29 shows the area, on the display screen 31a, assuming that the yaw angles are identical. Thus, those two areas are not similar in shape. In particular, even if the input area rectangular for example, the input area on the display screen 31a is not rectangular.

In this case, the portable input device 1 can inform the operator of the relative location of the calibration tool within the input area. This makes it easier for the operator to optimize the input area on the input surface. The display screen 31a displays a representation of the shape of the input area on the input surface 4a assuming the yaw angles YA1 and YA2 are the same. The calibration tool is mapped to this area based on where it is in the input area. FIG. 28 shows three physical locations PL1 through PL3 in a configuration where the yaw angles of the two digital cameras 2 and 3 are slightly different. These locations would appear as shown in FIG. 29 on the display screen 31a which assumes that the yaw angles of the digital cameras 2 and 3 are the same.

<Second Embodiment without a Physical Input Surface>

A portable input device of the second embodiment according to the present invention can be used in a space without a physical input surface used in the case of the first embodiment. What is different in the second embodiment from the first embodiment is that the second embodiment does not include the whiteboard 4, and includes the other components in FIG. 1. In the following description, there will be described another suitable method to adjust the arrangement of digital cameras and to calibrate a detection band.

Figure 19:
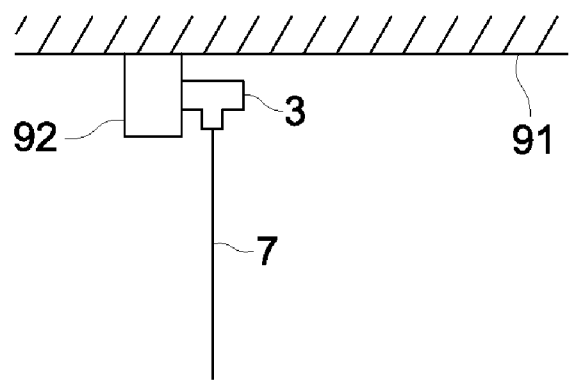
FIG. 19 is a diagram showing how a digital camera is attached on the ceiling in a second embodiment of the present invention.

The amount of misalignment of a roll angle can be much larger when configuring a portable input device without a physical input surface. When special mounting provisions are made to use as shown in FIG. 19, the alignment procedures used in the case of the first embodiment can be applied. FIG. 19 shows an example of such special mounting provisions. In this figure, a reference numeral 91 denotes a ceiling, and a mounting member 92 is secured on the ceiling 91. A digital camera 3 is adjustably mounted with a bracket (not shown) on the surface of the mounting member 92. The surface of the mounting member 92 attached to the ceiling and the surface on which the digital camera 3 is mounted is perpendicular to each other. The mounting member 92 extends in the direction perpendicular to the sheet surface, and another digital camera 2 (not shown) is attached behind the digital camera 3 on the same surface of the mounting member 92 as the digital camera 3 is attached. Thus, an optical axis of the digital camera 3 and an optical axis (not shown) of the digital camera 2 are substantially on the same surface.

Using the above-described mounting member 92 to attach the digital cameras 2 and 3 on the ceiling 91 causes less roll angle error than attaching them directly on the ceiling 91. In this situation, the methods illustrated in FIGS. 12, 13, and 14 can be used to adjust the yaw angles of the digital cameras 2 and 3.

Regarding the calibration of the detection band, the following method is preferable. The detection bands of two digital cameras are set as follows. The bottom side of the detection band is set at the center pixel line in each digital camera, and the top side of the detection band is set, depending on distance, at a pixel line a predetermined separation apart from the center pixel line. The detection zones for the two cameras thus almost overlap because the roll angle error is very small. In this method, the input surface is defined by the center pixel line.

The width of the detection bands is calibrated using the calibration tool 27a placed at two different positions. When the operator places the calibration tool 27a at the desired location on the input surface, the controller executes a calibration program that detects the dimension indicator 28 of the calibration tool 27a on the image sensor of cameras 2 and 3. The controller calibrates the width of the detection bands for cameras 2 and 3 using the dimension indicator 28. In this embodiment, an input surface and detection zone are defined for each digital camera, and when determining whether an object is substantially in contact with the input surface, the detection zone of only one camera may be used for the object at any position on the input surface, or the detection zone of either camera may be used depending on the position of the object on the input surface, alternatively the detection zones of both digital cameras may be used.

In the above-described methods, the detection zone and the input surface were defined based on the center pixel line of the image sensor. However, the detection zone and the input surface can be differently defined instead of depending the center pixel line, and the position of the detection zone and the input surface in the viewing field of the digital camera can be determined by the position of the calibration tool 27a which can be arbitrarily positioned by the operator.

What is claimed is:

1. A portable input device, comprising:
a first image pickup device having an image sensor;
a second image pickup device which has an image sensor and is provided away from the first image pickup device to define a baseline having a predetermined baseline length extending from the first image pickup device to the second image pickup device, wherein a first optical axis of the first image pickup device and the baseline form a first angle, and a second optical axis of the second image pickup device and the baseline form a second angle; an input surface is defined in a vicinity of a surface including the baseline, the first optical axis, and the second optical axis; a detection zone having a predetermined thickness is defined in a vicinity of the input surface so as to cover the input surface; at least one of the first image pickup device and the second pickup device is assumed as a detection image pickup device; the image sensor of the detection image pickup device is assumed as a detection image sensor; and a detection band is defined as an image, of the detection zone at a predetermined position on the input surface, assumed to be formed on the detection image sensor;
a calibration tool having an dimension indicator thereon;
a controller configured to process a first image and a second image, the first image which is taken by the first image pickup device with the calibration tool placed at a first position on the input surface, the second image which is taken by the second image pickup device with the calibration tool placed at the first position on the input surface; obtain coordinates, normalized by the baseline length, of the first position on the input surface based on the first image, the second image, the first angle, and the second angle; obtain a first position and a first width of the detection band for the first position on the input surface based on a dimension of an image of the dimension indicator in the first image or the second image taken by the detection image pickup device; process a third image and a fourth image, the third image which is taken by the first image pickup device with the calibration tool placed at a second position on the input surface, the fourth image which is taken by the second image pickup device with the calibration tool placed at the second position on the input surface; obtain coordinates, normalized by the baseline length, of the second position on the input surface based on the third image, the fourth image, the first angle, and the second angle; obtain a second position and a second width of the detection band for the second position on the input surface based on a dimension of an image of the dimension indicator in the third image or the fourth image taken by the detection image pickup device;
a storage section configured to store the first position and the first width of the detection band in relationship to the first position on the input surface, and store the second position and the second width of the detection band in relation to the second position on the input surface.

2. The portable input device of claim 1, wherein the controller interpolates or extrapolates a position and a width of the detection band for a third position on the input surface, based on the third position on the input surface, the first position, the first width, the second position, and the second width of the detection band.

3. The portable input device of claim 1, wherein the storage section stores the first position and the first width of the detection band in relation to a distance between a surface including the surface of the detection image sensor and the first position on the input surface, and stores the second position and the second width of the detection band in relation to a distance between the surface including the surface of the detection image sensor and the second position on the input surface.

4. The portable input device of claim 1, wherein a positional relationship between the first image pickup device and the second image pickup device is broken down before the first image pickup device and the second image pickup device are relocated, and after the first image pickup device and the second image pickup device are relocated, the first image pickup device and the second image pickup device are configured to be a portable input device, which portable input device including:
the first image pickup device;
the second image pickup device which is provided away from the first image pickup device to define a second baseline having a second predetermined baseline length extending from the first image pickup device to the second image pickup device, wherein the first optical axis of the first image pickup device and the second baseline form a third angle, and the second optical axis of the second image pickup device and the second baseline form a fourth angle; a second input surface is defined in a vicinity of a surface including the second baseline, the first optical axis, and the second optical axis; a second detection zone having a second predetermined thickness is defined in a vicinity of the second input surface so as to cover the second input surface; at least one of the first image pickup device and the second pickup device is assumed as a second detection image pickup device; the image sensor of the second detection image pickup device is assumed as a second detection image sensor;

and a second detection band is defined as an image, of the second detection zone at a predetermined position on the second input surface, assumed to be formed on the second detection image sensor;

the calibration tool having;

the controller configured to process a fifth image and a sixth image respectively taken by the first image pickup device and the second image pickup device, both with the calibration tool placed at a third position on the second input surface; obtain coordinates, normalized by the second baseline length, of the third position on the second input surface based on the fifth image, the sixth image, the third angle, and the fourth angle; obtain a third position and a third width of the second detection band for the third position on the second input surface based on a dimension of an image of the dimension indicator in the fifth image or the sixth image taken by the second detection image pickup device; process a seventh image and an eighth image respectively taken by the first image pickup device and the second image pickup device, both with the calibration tool placed at the fourth position on the second input surface; obtain coordinates, normalized by the second baseline length, of the fourth position on the second input surface based on the seventh image, the eighth image, the first angle, and the second angle; obtain a third position and a third width of the second detection band for the fourth position on the second input surface based on a dimension of an image of the dimension indicator in the seventh image or the eighth image taken by the second detection image pickup device;

the storage section configured to store the third position and the third width of the second detection band in relation to the third position on the second input surface, and store the fourth position and the fourth width of the second detection band in relation to the fourth position on the second input surface.

5. The portable input device of claim 1, wherein the first angle and the second angle are substantially identical.

6. The portable input device of claim 1, wherein the first image pickup device includes a first direction indicating member forming the first angle with respect to the first optical axis, the second image pickup device includes a second direction indicating member forming the second angle with respect to the second optical axis, and the first image pickup device and the second image pickup device are arranged such that the first direction indicating member and the second direction indicating member point towards each other.

7. The portable input device of claim 1, wherein the first image pickup device includes a first surface forming the first angle with respect to the first optical axis, the second image pickup device includes a second surface forming the second angle with respect to the second optical axis, and the first image pickup device and the second image pickup device are arranged such that the first surface and the second surface are parallel to a linear member assumed to be extended between the first image pickup device and the second image pickup device.

8. The portable input device of claim 1, wherein the first image pickup device includes a first laser emitter whose laser emission direction forms the first angle with respect to the first optical axis, the second image pickup device includes a second laser emitter whose laser emission direction forms the second angle with respect to the second optical axis, and the first image pickup device and the second image pickup device are arranged such that a laser beam emitted from the first laser emitter and a laser beam emitted from the second laser emitter are directed to the second laser emitter and the first laser emitter, respectively.

9. The portable input device of claim 1, wherein the first image pickup device includes a laser emitter whose laser emission direction forms the first angle with respect to the first optical axis, the second image pickup device include a reflection surface whose normal line forms the second angle with respect to the second optical axis, and the first image pickup device and the second image pickup device are arranged such that a laser beam emitted from the first laser emitter is reflected on the reflection surface of the second image pickup device in a direction toward the laser emitter.

10. The portable input device of claim 1, wherein the first image pickup device is positioned such that in an image taken by the first image pickup device so as to include the second image pickup device, an image of the second image pickup device is located at a predetermined position, and the second image pickup device is positioned such that in an image taken by the second image pickup device so as to include the first image pickup device, an image of the first image pickup device is located at a predetermined position.

11. The portable input device of claim 1, wherein the dimension indicator on the calibration tool has a different color from the other part of the calibration tool.

12. The portable input device of claim 1, wherein the dimension indicator on the calibration tool is provided away from both ends of the calibration tool.

13. The portable input device of claim 1, comprising:
an input table, on a surface of which input table the input surface is defined.

14. A method for configuring a portable input device, the method comprising the steps of:
arranging a first image pickup device having an image sensor and a second image pickup device having an image sensor such that the first image pickup device and the second image pickup device define a baseline having a predetermined baseline length extending from the first image pickup device to the second image pickup device, wherein a first optical axis of the first image pickup device and the baseline form a first angle, and a second optical axis of the second image pickup device and the baseline form a second angle; an input surface is defined in a vicinity of a surface including the baseline, the first optical axis, and the second optical axis; a detection zone having a predetermined thickness is defined in a vicinity of the input surface so as to cover the input surface; at least one of the first image pickup device and the second pickup device is assumed as a detection image pickup device; the image sensor of the detection image pickup device is assumed as a detection image sensor; and a detection band is defined as an image, of the detection zone at a predetermined position on the input surface, assumed to be formed on the detection image sensor;

placing a calibration tool having an dimension indicator thereon, at a first position on the input surface;

taking a first image with the first image pickup device and a second image with the second image pickup device, the first image and the second image both including the input surface and the calibration tool at the first position on the input surface;

obtaining coordinates, normalized by the baseline length, of the first position on the input surface based on the first image, the second image, the first angle, and the second angle;

obtaining a first position and a first width of the detection band for the first position on the input surface based on a dimension of an image of the dimension indicator in the first image or the second image taken by the detection image pickup device;

placing the calibration tool at a second position on the input surface;

taking a third image with the first image pickup device and a fourth image with the second image pickup device, the third image and the fourth image both including the input surface and the calibration tool at the second position on the input surface;

obtaining coordinates, normalized by the baseline length, of the second position on the input surface based on the third image, the fourth image, the first angle, and the second angle;

obtaining a second position and a second width of the detection band for the second position on the input surface based on a dimension of an image of the dimension indicator in the third image or the fourth image taken by the detection image pickup device;

storing in a storage section the first position and the first width of the detection band in relation to the first position on the input surface; and storing in the storage section the second position and the second width of the detection band in relation to the second position on the input surface.

15. The method of claim 14, comprising the step of:

interpolating or extrapolating a position and a width of the detection band for a third position on the input surface, based on the position on the third position on the input surface, the first position, the first width, the second position, and the second width of the detection band.

16. The method of claim 14, wherein at the step of storing the first position and the first width of the detection band are stored in relation to a distance between a surface including the surface of the detection image sensor and the first position on the input surface, and at the step of storing the second position and the second width of the detection band, the second position and the second width of the detection band are stored in relation to a distance between the surface including the surface of the detection image sensor and the second position on the input surface.

17. The method of claim 14, comprising the step of:

breaking down the configuration of the portable input device configured by the method of claim 1, before relocation, wherein the method comprises, after the step of breaking down, the steps of:

arranging the first image pickup device and the second image pickup device such that the first image pickup device and the second image pickup device define a second baseline having a second predetermined baseline length extending from the first image pickup device to the second image pickup device, wherein the first optical axis of the first image pickup device and the second baseline form a third angle, and the second optical axis of the second image pickup device and the second baseline form a fourth angle; a second input surface is defined in a vicinity of a surface including the second baseline, the first optical axis, and the second optical axis; a second detection zone having a second predetermined thickness is defined in a vicinity of the second input surface so as to cover the second input surface; at least one of the first image pickup device and the second pickup device is assumed as a second detection image pickup device; the image sensor of the second detection image pickup device is assumed as a second detection image sensor; and a second detection band is defined as an image, of the second detection zone at a predetermined position on the second input surface, assumed to be formed on the detection image sensor;

placing the calibration tool at a third position on the second input surface;

taking a fifth image with the first image pickup device and a sixth image with the second image pickup device, the fifth image and the sixth image both including the second input surface and the calibration tool at the third position on the second input surface;

obtaining coordinates, normalized by the second baseline length, of the third position on the second input surface based on the fifth image, the sixth image, the third angle, and the fourth angle;

obtaining a third position and a third width of the second detection band for the third position on the second input surface based on a dimension of an image of the dimension indicator in the fifth image or the sixth image taken by the second detection image pickup device;

placing the calibration tool at a fourth position on the second input surface;

taking a seventh image with the first image pickup device and an eighth image with the second image pickup device, the seventh image and the eighth image both including the second input surface and the calibration tool at the fourth position on the second input surface;

obtaining coordinates, normalized by the second baseline length, of the fourth position on the second input surface based on the seventh image, the eighth image, the third angle, and the fourth angle;

obtaining a fourth position and a fourth width of the second detection band for the fourth position on the second input surface based on a dimension of an image of the dimension indicator in the seventh image or the eighth image taken by the second detection image pickup device;

storing in the storage section the third position and the third width of the second detection band in relation to the third position on the second input surface; and storing in the storage section the fourth position and the fourth width of the second detection band in relation to the fourth position on the second input surface.

18. The method of claim 14, wherein the first angle and the second angle are substantially identical.

19. The method of claim 14, wherein the first image pickup device includes a first direction indicating member forming the first angle with respect to the first optical axis, the second image pickup device includes a second direction indicating member forming the second angle with respect to the second optical axis, wherein the step of arranging a first image pickup device and a second image pickup device includes the step of:

arranging the first image pickup device and the second image pickup device such that the first direction indicating member and the second direction indicating member point towards each other.

20. The method of claim 14, wherein the first image pickup device includes a first surface which forms a first angle with respect to the first optical axis, and the second image pickup device includes a second surface which forms the second angle with respect to the second optical axis, wherein the step of arranging a first image pickup device and a second image pickup device includes the steps of:

extending a linear member between the first image pickup device and the second image pickup device; and arranging the first image pickup device and the second image pickup device such that the first surface and the second surface are parallel to the linear member.

21. The method of claim 14, wherein the first image pickup device includes a first laser emitter whose laser emission direction forms the first angle with respect to the first optical axis, the second image pickup device includes a second laser emitter whose laser emission direction forms the second angle with respect to the second optical axis, wherein the step of arranging a first image pickup device and a second image pickup device includes the step of:
   arranging the first image pickup device and the second image pickup device such that a laser beam emitted from the first laser emitter and a laser beam emitted from the second laser emitter are directed to the second laser emitter and the first laser emitter, respectively.

22. The method of claim 14, wherein the first image pickup device includes a laser emitter whose laser emission direction forms the first angle with respect to the first optical axis, the second image pickup device include a reflection surface whose normal line forms the second angle with respect to the second optical axis, wherein the step of arranging a first image pickup device and a second image pickup device includes the step of:
   arranging the first image pickup device and the second image pickup device such that a laser beam emitted from the first laser emitter is reflected on the reflection surface of the second image pickup device in a direction directed to the laser emitter.

23. The method for configuring a portable input device of claim 14, wherein the step of arranging a first image pickup device and a second image pickup device includes the step of:
   taking a first adjustment image cyclically, with the first image pickup device, including the second image pickup device;
   aligning the first image pickup device so that an image of the second image pickup device in the first adjustment image is located at a predetermined position;
   taking a second adjustment image cyclically, with the second image pickup device, including the first image pickup device; and
   aligning the second image pickup device so that an image of the first image pickup device in the second adjustment image is located at a predetermined position.

24. The method of claim 14, wherein the dimension indicator on the calibration tool has a different color from the other part of the calibration tool.

25. The method of claim 14, wherein the dimension indicator on the calibration tool is provided away from both ends of the calibration tool.

26. The method of claim 14, comprising:
   an input table, on a surface of which input table the input surface is defined.

27. A non-transitory computer-readable recording medium storing a program for making a computer perform a method for configuring a portable input device, the method comprising the steps of:
   arranging a first image pickup device having an image sensor and a second image pickup device having an image sensor such that the first image pickup device and the second image pickup device define a baseline having a predetermined baseline length extending from the first image pickup device to the second image pickup device, wherein a first optical axis of the first image pickup device and the baseline form a first angle, and a second optical axis of the second image pickup device and the baseline form a second angle; an input surface is defined in a vicinity of a surface including the baseline, the first optical axis, and the second optical axis; a detection zone having a predetermined thickness is defined in a vicinity of the input surface so as to cover the input surface; at least one of the first image pickup device and the second pickup device is assumed as a detection image pickup device; the image sensor of the detection image pickup device is assumed as a detection image sensor; and a detection band is defined as an image, of the detection zone at a predetermined position on the input surface, assumed to be formed on the detection image sensor;
   placing a calibration tool having an dimension indicator thereon, at a first position on the input surface;
   taking a first image with the first image pickup device and a second image with the second image pickup device, the first image and the second image both including the input surface and the calibration tool at the first position on the input surface;
   obtaining coordinates, normalized by the baseline length, of the first position on the input surface based on the first image, the second image, the first angle, and the second angle;
   obtaining a first position and a first width of the detection band for the first position on the input surface based on a dimension of an image of the dimension indicator in the first image or the second image taken by the detection image pickup device;
   placing the calibration tool at a second position on the input surface;
   taking a third image with the first image pickup device and a fourth image with the second image pickup device, the third image and the fourth image both including the input surface and the calibration tool at the second position on the input surface;
   obtaining coordinates, normalized by the baseline length, of the second position on the input surface based on the third image, the fourth image, the first angle, and the second angle;
   obtaining a second position and a second width of the detection band for the second position on the input surface based on a dimension of an image of the dimension indicator in the third image or the fourth image taken by the detection image pickup device;
   storing in a storage section the first position and the first width of the detection band in relation to the first position on the input surface; and
   storing in the storage section the second position and the second width of the detection band in relation to the second position on the input surface.

28. The computer-readable recording medium of claim 27, wherein the method comprises the step of:
   interpolating or extrapolating a position and a width of the detection band for a third position on the input surface, based on the position on the third position on the input surface, the first position, the first width, the second position, and the second width of the detection band.

29. The computer-readable recording medium of claim 27, wherein at the step of storing the first position and the first width of the detection band are stored in relation to a distance between a surface including the surface of the detection image sensor and the first position on the input surface, and at the step of storing the second position and the second width of the detection band, the second position and the second width of the detection band are stored in relation to a distance between the surface including the surface of the detection image sensor and the second position on the input surface.

30. The computer-readable recording medium of claim 27, wherein the method comprises the step of:
   breaking down the configuration of the portable input device configured by the method, before relocation, wherein the method comprises, after the step of breaking down, the steps of:
arranging the first image pickup device and the second image pickup device such that the first image pickup device and the second image pickup device define a second baseline having a second predetermined baseline length extending from the first image pickup device to the second image pickup device, wherein the first optical axis of the first image pickup device and the second baseline form a third angle, and the second optical axis of the second image pickup device and the second baseline form a fourth angle; a second input surface is defined in a vicinity of a surface including the second baseline, the first optical axis, and the second optical axis; a second detection zone having a second predetermined thickness is defined in a vicinity of the second input surface so as to cover the second input surface; at least one of the first image pickup device and the second pickup device is assumed as a second detection image pickup device; the image sensor of the second detection image pickup device is assumed as a second detection image sensor; and a second detection band is defined as an image, of the second detection zone at a predetermined position on the second input surface, assumed to be formed on the detection image sensor;
placing the calibration tool at a third position on the second input surface;
taking a fifth image with the first image pickup device and a sixth image with the second image pickup device, the fifth image and the sixth image both including the second input surface and the calibration tool at the third position on the second input surface;
obtaining coordinates, normalized by the second baseline length, of the third position on the second input surface based on the fifth image, the sixth image, the third angle, and the fourth angle;
obtaining a third position and a third width of the second detection band for the third position on the second input surface based on a dimension of an image of the dimension indicator in the fifth image or the sixth image taken by the second detection image pickup device;
placing the calibration tool at a fourth position on the second input surface;
taking a seventh image with the first image pickup device and an eighth image with the second image pickup device, the seventh image and the eighth image both including the second input surface and the calibration tool at the fourth position on the second input surface;
obtaining coordinates, normalized by the second baseline length, of the fourth position on the second input surface based on the seventh image, the eighth image, the third angle, and the fourth angle;
obtaining a fourth position and a fourth width of the second detection band for the fourth position on the second input surface based on a dimension of an image of the dimension indicator in the seventh image or the eighth image taken by the second detection image pickup device;
storing in the storage section the third position and the third width of the second detection band in relation to the third position on the second input surface; and
storing in the storage section the fourth position and the fourth width of the second detection band in relation to the fourth position on the second input surface.

31. The computer-readable recording medium of claim 27, wherein the first angle and the second angle are substantially identical.

32. The computer-readable recording medium of claim 27, wherein the first image pickup device includes a first direction indicating member forming the first angle with respect to the first optical axis, the second image pickup device includes a second direction indicating member forming the second angle with respect to the second optical axis, wherein the step of arranging a first image pickup device and a second image pickup device includes the step of:
arranging the first image pickup device and the second image pickup device such that the first direction indicating member and the second direction indicating member point towards each other.

33. The computer-readable recording medium of claim 27, wherein the first image pickup device includes a first surface which forms a first angle with respect to the first optical axis, and the second image pickup device includes a second surface which forms the second angle with respect to the second optical axis, wherein the step of arranging a first image pickup device and a second image pickup device includes the steps of:
extending a linear member between the first image pickup device and the second image pickup device; and
arranging the first image pickup device and the second image pickup device such that the first surface and the second surface are parallel to the linear member.

34. The computer-readable recording medium of claim 27, wherein the first image pickup device includes a first laser emitter whose laser emission direction forms the first angle with respect to the first optical axis, the second image pickup device includes a second laser emitter whose laser emission direction forms the second angle with respect to the second optical axis, wherein the step of arranging a first image pickup device and a second image pickup device includes the step of:
arranging the first image pickup device and the second image pickup device such that a laser beam emitted from the first laser emitter and a laser beam emitted from the second laser emitter are directed to the second laser emitter and the first laser emitter, respectively.

35. The computer-readable recording medium of claim 27, wherein the first image pickup device includes a laser emitter whose laser emission direction forms the first angle with respect to the first optical axis, and the second image pickup device include a reflection surface whose normal line forms the second angle with respect to the second optical axis, wherein the step of arranging a first image pickup device and a second image pickup device includes the step of:
arranging the first image pickup device and the second image pickup device such that a laser beam emitted from the first laser emitter is reflected on the reflection surface of the second image pickup device in a direction directed to the laser emitter.

36. The computer-readable recording medium of claim 27, wherein the step of arranging a first image pickup device and a second image pickup device includes the step of:
taking a first adjustment image cyclically, with the first image pickup device, including the second image pickup device;
aligning the first image pickup device so that an image of the second image pickup device in the first adjustment image is located at a predetermined position;
taking a second adjustment image cyclically, with the second image pickup device, including the first image pickup device; and
aligning the second image pickup device so that an image of the first image pickup device in the second adjustment image is located at a predetermined position.

37. The computer-readable recording medium of claim 27, wherein the dimension indicator on the calibration tool has a different color from the other part of the calibration tool.

38. The computer-readable recording medium of claim 27, wherein the dimension indicator on the calibration tool is provided away from both ends of the calibration tool.

39. The computer-readable recording medium of claim 27, the portable input device comprising:
an input table on a surface of which the input surface is defined.

* * * * *